United States Patent
Nagai et al.

(10) Patent No.: US 8,583,789 B2
(45) Date of Patent: Nov. 12, 2013

(54) COMPUTER SYSTEM MANAGEMENT METHOD AND MANAGEMENT APPARATUS

(75) Inventors: Takayuki Nagai, Machida (JP);
Masataka Nagura, Yokohama (JP);
Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 221 days.

(21) Appl. No.: 13/143,493

(22) PCT Filed: Mar. 28, 2011

(86) PCT No.: PCT/JP2011/057592
§ 371 (c)(1),
(2), (4) Date: Jul. 6, 2011

(87) PCT Pub. No.: WO2012/131868
PCT Pub. Date: Oct. 4, 2012

(65) Prior Publication Data
US 2012/0254406 A1    Oct. 4, 2012

(51) Int. Cl.
*G06F 15/173* (2006.01)
(52) U.S. Cl.
USPC .......................................... 709/224; 709/223
(58) Field of Classification Search
USPC ........................................................ 709/224
See application file for complete search history.

(56) References Cited

U.S. PATENT DOCUMENTS 6,990,601 B1 * 1/2006 Tsuneya et al. ................ 714/4.5
7,107,185 B1 * 9/2006 Yemini et al. ................ 702/183
2006/0171333 A1 * 8/2006 Shimada et al. .............. 370/254
2009/0300428 A1 * 12/2009 Matsumoto et al. ............ 714/47
2010/0325493 A1 * 12/2010 Morimura et al. .............. 714/39
2011/0145647 A1   6/2011 Hidaka et al.

FOREIGN PATENT DOCUMENTS

| JP | 2001125854 A | 11/1987 |
| JP | 2007087232 A | 10/1993 |
| WO | 2010122604 A1 | 10/2010 |
| WO | 2010016239 A1 | 11/2010 |

OTHER PUBLICATIONS

International Search Report for application No. PCT/JP2011/057592 issued on Aug. 23, 2011.
U.S. Appl. No. 12/529,521, filed Sep. 1, 2009 entitled "Computer for Identifying Cause of Occurrence of Event in Computer System having a Plurality of Node Apparatuses."

* cited by examiner

*Primary Examiner* — Yemane Mesfin
*Assistant Examiner* — Jeff Banthrongsack
(74) *Attorney, Agent, or Firm* — Volpe and Koenig, P.C.

(57) ABSTRACT

An object of the present invention is to create information for use in problem analysis only for a required event in a case where an event denoting a change in the configuration of a computer system has been detected. A management apparatus detects a configuration change of the computer system as an event and records this event in an event management table T30. The management apparatus holds an event propagation model for analyzing a problem, and records an event corresponding to the event propagation model in target event management information T34. The management apparatus executes a problem analysis process in a case where a detected event is registered in the target event management information.

7 Claims, 32 Drawing Sheets

Logical volume management table (Host2)

| Drive name (C100) | iSCSI initiator name (C101) | Coupling-destination iSCSI target (C102) | LUN ID (C103) |
|---|---|---|---|
| E: | com.abc.sv2 | com.abc.sto2 | 0 |
| ... | ... | ... | ... |

FIG. 6C

Logical volume management table (Host3) — T10

| Drive name | iSCSI initiator name | Coupling-destination iSCSI target | LUN ID |
|---|---|---|---|
| E: | com.abc.sv3 | com.abc.sto3 | 0 |
| ... | ... | ... | ... |

C100, C101, C102, C103

| ID | Capacity | RAID group # | Target ID | LUN ID |
|---|---|---|---|---|
| VOL1 | 20GB | RG1 | TG1 | 0 |
| VOL2 | 20GB | RG1 | TG1 | 1 |
| VOL3 | 20GB | RG1 | TG2 | 0 |
| VOL4 | 20GB | RG1 | TG2 | 1 |
| VOL5 | 40GB | RG2 | TG3 | 0 |
| VOL6 | 40GB | RG2 | TG3 | 1 |
| ... | ... | ... | ... | ... |

Volume management table T20

| ID | Capacity | RAID group # | Target ID | LUN ID |
|---|---|---|---|---|
| VOL1 | 20GB | RG2 | TG1 | 0 |
| VOL2 | 20GB | RG1 | TG1 | 1 |
| VOL3 | 20GB | RG1 | TG2 | 0 |
| VOL4 | 20GB | RG1 | TG2 | 1 |
| VOL5 | 80GB | RG2 | TG3 | 0 |
| VOL6 | 40GB | RG2 | TG3 | 1 |
| ... | ... | ... | ... | ... |

T21 iSCSI target management table

| C210 | C211 | C212 |
|---|---|---|
| ID | iSCSI target name | Coupling-allowed iSCSI initiator |
| TG1 | com.abc.sto1 | com.abc.sv1, com.abc.sv11 |
| TG2 | com.abc.sto2 | com.abc.sv2 |
| TG3 | com.abc.sto3 | com.abc.sv3 |
| ... | ... | ... |

| | iSCSI target management table | |
|---|---|---|
| C210 | C211 | C212 |
| ID | iSCSI target name | Coupling-allowed iSCSI initiator |
| TG1 | com.abc.sto1 | com.abc.sv1 |
| TG2 | com.abc.sto2 | com.abc.sv2 |
| TG3 | com.abc.sto3 | com.abc.sv3 |
| ... | ... | ... |

FIG. 11

Event management table T30

| C300 | C301 | C302 | C303 | C304 | C305 | C306 |
|---|---|---|---|---|---|---|
| Event ID | Apparatus ID | Component ID | Parameter | Status | Processed flag | Date/time |
| EV1 | SYS1 | TG1 | Coupling-allowed iSCSI initiator | Change | NO | 2010-01-01 15:00:00 |
| EV2 | SYS1 | VOL1 | RAID group ID | Change | NO | 2010-01-01 15:05:00 |
| EV3 | SYS1 | VOL5 | Capacity | Change | NO | 2010-01-01 15:10:00 |
| EV4 | HOST1 | E: | — | Addition | NO | 2010-01-01 15:15:00 |
| EV5 | HOST1 | E: | — | Deletion | NO | 2010-01-01 16:00:00 |
| ... | ... | ... | ... | ... | ... | ... |

| Model ID | Observed event | Cause |
|---|---|---|
| | C310 C311 C312 | |
| Rule1 | Host computer logical volume ERROR, storage apparatus I/O port ERROR | Storage apparatus I/O port failure |

Event propagation model (table title)

| Model ID | Observed event | Cause |
|---|---|---|
| | Event propagation model | |
| | C310     C311     C312 | |
| Rule2 | Host computer logical volume ERROR, storage apparatus RAID group ERROR | Storage apparatus RAID group failure |

FIG. 13A

Causality matrix T32 — C320

| Event propagation model ID | | | Rule1 — C322 | | | | | | |
|---|---|---|---|---|---|---|---|---|---|
| | | | | SYS1 | | | | | |
| | Cause | | VOL1 | VOL2 | | VOL3 | | VOL5 | ... |
| Observed event | | | Failure | Failure | | Failure | | Failure | |
| SYS1 | VOL1 | ERROR | ○ | — | | — | | — | ... |
| | VOL2 | ERROR | — | ○ | | — | | — | ... |
| | VOL3 | ERROR | — | — | | ○ | | — | ... |
| | VOL5 | ERROR | — | — | | — | | ○ | ... |
| HOST1 | E: | ERROR | ○ | ○ | | — | | — | ... |
| HOST2 | F: | ERROR | — | — | | — | | — | ... |
| HOST3 | E: | ERROR | — | — | | ○ | | ○ | ... |
| ... | | | ... | ... | | ... | | ... | ... |

Causality matrix T32

| Event propagation model ID | | | Rule1 | | | | ... |
|---|---|---|---|---|---|---|---|
| | | | SYS1 | | | | |
| | Cause | | VOL1 | VOL2 | VOL3 | VOL5 | |
| Observed event | | | Failure | Failure | Failure | Failure | |
| SYS1 | VOL1 | ERROR | O | — | — | — | ... |
| | VOL2 | ERROR | — | — | — | — | ... |
| | VOL3 | ERROR | — | — | O | — | ... |
| | VOL5 | ERROR | — | — | — | O | ... |
| HOST1 | E: | ERROR | O | — | — | — | ... |
| | F: | ERROR | — | — | — | — | ... |
| HOST2 | E: | ERROR | — | — | O | — | ... |
| HOST3 | E: | ERROR | — | — | — | O | ... |
| ... | | | ... | ... | ... | ... | ... |

C320 — Event propagation model ID
C321 — Observed event
C322 — Cause
C323 — (matrix body)

FIG. 13C

Causality matrix T32

| Event propagation model ID | | Rule1 | | | Rule2 | | | ... |
|---|---|---|---|---|---|---|---|---|
| Cause | | SYS1 | | | SYS1 | | | |
| | | RG1 | | | RG2 | | | |
| | | Failure | | | Failure | | | |
| Observed event | | | | | | | | |
| SYS1 | RG1 | ERROR | ○ | | — | | | ... |
| | RG2 | ERROR | — | | ○ | | | ... |
| HOST1 | E: | ERROR | ○ | | — | | | ... |
| | F: | ERROR | ○ | | — | | | ... |
| HOST2 | E: | ERROR | ○ | | — | | | ... |
| HOST3 | E: | ERROR | — | | ○ | | | ... |
| ... | | ... | ... | | ... | | | ... |

FIG. 13D

| Causality matrix T32 C320 | | Event propagation model ID | Rule2 | | | ... |
|---|---|---|---|---|---|---|
| | | Cause | SYS1 RG1 Failure | SYS1 RG2 Failure | | ... |
| | Observed event | | | | | |
| SYS1 | RG1 | ERROR | ○ | — | | ... |
| | RG2 | ERROR | — | ○ | | ... |
| HOST1 | E: | ERROR | — | ○ | | ... |
| HOST2 | F: | ERROR | ○ | — | | ... |
| HOST3 | E: | ERROR | ○ | — | | ... |
| | E: | ERROR | — | ○ | | ... |
| ... | ... | ... | ... | ... | | ... |

FIG. 14A

Topology creation method T33

| ID | Origination component | Termination component | Via component | Topology creation condition |
|---|---|---|---|---|
| TP1 | Host computer logical volume | Storage apparatus I/O port | Storage apparatus iSCSI target | (Logical volume. iSCSI initiator name) = (iSCSI target. coupling-allowed iSCSI initiator) (I/O port. iSCSI target ID) = (iSCSI target. ID) |

FIG. 14B

Topology creation method T33

| ID | Origination component | Termination component | Via component | Topology creation condition |
|---|---|---|---|---|
| TP2 | Host computer logical volume | Storage apparatus RAID group | Storage apparatus iSCSI target, storage apparatus volume | (Logical volume. iSCSI initiator name) = (iSCSI target. coupling-allowed iSCSI initiator)<br><br>(Volume. iSCSI target ID) = (iSCSI target. ID)<br>(Volume. RAID group ID) = (RAID group. ID) |

Deployment-target event management table T34

| Machine type (C340) | Component type (C341) | Parameter (C342) | Event type (C343) | Event propagation model ID (C344) |
|---|---|---|---|---|
| Host computer | Logical volume | — | Addition, deletion | Rule1, Rule2 |
| Storage | iSCSI target | — | Addition, deletion | Rule1, Rule2 |
| Storage | I/O port | — | Addition, deletion | Rule1 |
| Storage | RAID group | — | Addition, deletion | Rule2 |
| Storage | iSCSI target | Coupling-allowed iSCSI initiator | Change | Rule1 |
| Storage | Volume | RAID group ID | Change | Rule2 |

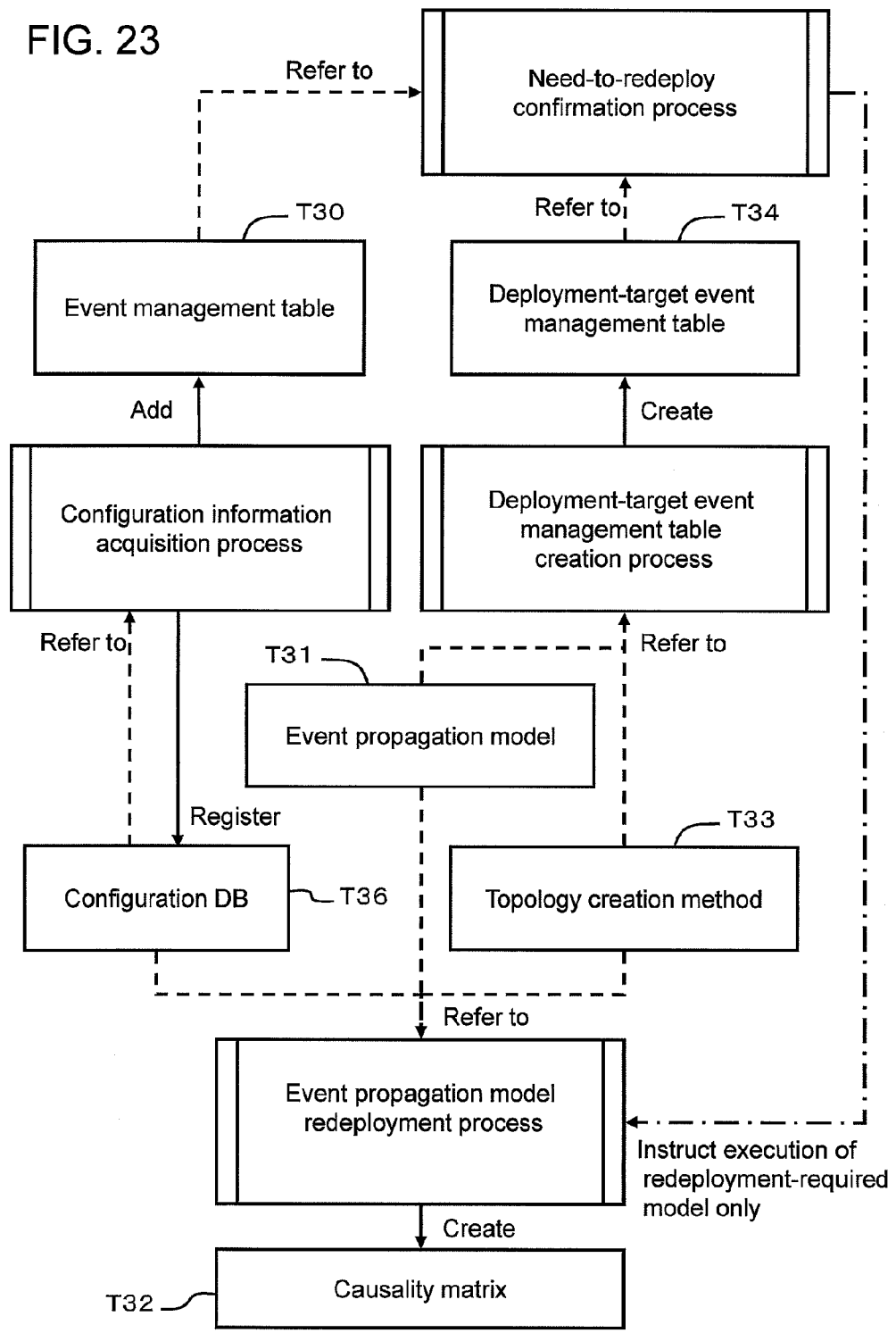

US 8,583,789 B2

COMPUTER SYSTEM MANAGEMENT METHOD AND MANAGEMENT APPARATUS

TECHNICAL FIELD

The present invention relates to a computer system management method and a management apparatus.

BACKGROUND ART

When management software for managing a computer system comprising a large number of node apparatuses detects either problems or the symptoms of problems, the management software infers the causal event from thereamong (Patent Literature 1). More specifically, the management software disclosed in Patent Literature 1 treats various types of problems that occur in management-target apparatuses as events, and accumulates event information in an event database. The management software comprises an analysis engine. The analysis engine analyzes the causal relationship between multiple problem events, which have occurred in a management-target apparatus.

The analysis engine accesses a configuration database having inventory information of the management-target apparatus, and recognizes the configuration components inside the apparatus, which is on an I/O (Input/Output) path, as a single group called a "topology". The analysis engine applies a problem propagation model to this topology and constructs a causality matrix.

The problem propagation model is configured from a condition statement and an analysis result, which have been determined beforehand. The causality matrix comprises a causal event denoting the causative problem, and a group of relevant events denoting the problem that is occurring as a result of the causal event. Specifically, an event, which is described as the root cause of a problem in the THEN part of the rule, is the causal event. An event other than the causal event among the events described in the IF part of the rule is the relevant event.

CITATION LIST

Patent Literature

[PTL 1]
U.S. Pat. No. 7,107,185

SUMMARY OF INVENTION

Technical Problem

When a problem occurs in a certain apparatus inside a computer system, this problem constitutes a cause and another problem occurs in either one or multiple other apparatuses coupled to the apparatus in which the problem occurred. As a result of this, multiple problems are discovered inside the computer system.

Management software, which manages various node apparatuses, such as a host computer, a network apparatus, and a storage apparatus, comprises a problem analysis function. The management software uses the analysis function to present the administrator with the root causative problem of the multiple problems.

A problem analysis engine for realizing the problem analysis function has multiple event propagation models defined on the basis of problem analysis knowhow. The management software acquires an inter-apparatus topology from the configuration information of the node apparatuses, and applies the event propagation models to this topology. The management software outputs a causality matrix, which describes the corresponding relationship between the problem event that occurred in the apparatus, and the event, which constitutes the root cause of this problem. The problem analysis engine holds the causality matrix in a storage area and uses this causality matrix in problem analysis.

In a computer system, a new node apparatus may be added, an existing node apparatus may be removed, or a node apparatus setting may be changed for various reasons. The configuration of the computer system is changed like this. The management software discards the causality matrix each time that a change in the configuration information being held is detected. The management software deploys an event propagation model based on the latest topology and creates a new causality matrix corresponding to the latest configuration. Thereafter, an event propagation model deployment process is executed each time the computer system configuration changes.

However, it is conceivable that included among the configuration changes detected by the management software are configuration changes, which do not require the redeployment of the event propagation model. In the prior art, the redeployment of the event propagation model is performed even for a configuration change for which event propagation model redeployment is not necessary, thereby increasing the processing load on the management software. For example, due to the large number of nodes in a computer system such as a large-scale data center, the configuration changes relatively frequently due to either repair work or inspections, and the increase or decrease in apparatuses.

With the foregoing problem in view, an object of the present invention is to provide a computer system management method and a management apparatus that make it possible to reduce the management processing load.

Solution to Problem

In a method for managing a computer system related to one aspect of the present invention, the computer system comprises multiple node apparatuses, and a management apparatus for managing the multiple node apparatuses. The management apparatus holds at least one prescribed analysis rule and target event management information, which manages the corresponding relationship between an event, which is capable of being detected by the above-mentioned management apparatus, and the above-mentioned prescribed analysis rule. The prescribed analysis rule defines the relationship between a causal event, which is the cause of a problem that has occurred, and a relevant event, which denotes a problem that arises as a result of the causal event. The management apparatus determines whether or not this event is registered in the target event management information in a case where each node apparatus configuration change is detected as an event, and executes a prescribed process in a case where the detected event is registered in the target event management information.

The management apparatus acquires configuration information from the multiple node apparatuses, and the prescribed process may be a process, which identifies an analysis rule to be processed based on the detected event and the target event management information, applies the identified analysis rule to the configuration information, and creates information for problem analysis. For example, the management apparatus may apply the prescribed analysis rule to a specific configuration of the computer system, and create specific information for analyzing the problem (for example, a causality matrix, which will be described further below).

The management apparatus may create and hold the target event management information based on the content of the prescribed analysis rule.

The management apparatus may create and hold the target event management information by holding topology creation information, which stores multiple topology creation information for creating a topology denoting the coupling relationship between the respective node apparatuses, acquiring from the topology creation information a prescribed topology creation method corresponding to a prescribed analysis rule, and registering a node apparatus, which is stipulated in the acquired prescribed topology creation method, as the source of an event.

The management apparatus prepares and holds the target event management information at a prescribed timing, and the prescribed timing may be at least any one of a case in which the management apparatus is initially booted up, a case in which a new prescribed analysis rule is added, or a case in which the existing prescribed analysis rule is either deleted or changed.

In a case where a problem has been detected in any of the respective node apparatuses, the cause of the detected problem may be inferred based on the information for problem analysis.

The present invention can also be regarded as a computer system management method, and a computer program for managing the computer system.

BRIEF DESCRIPTION OF DRAWINGS

FIG. 6B is a diagram showing another example of the logical volume management table.

FIG. 6C is a diagram showing yet another example of the logical volume management table.

FIG. 8A is a diagram showing an example of the configuration of an iSCSI target management table.

FIG. 8B is a diagram showing another example of the iSCSI target management table.

FIG. 11 is a diagram showing an example of the configuration of an event management table.

FIG. 12A is a diagram showing an example of the configuration of an event propagation model.

FIG. 12B is a diagram showing another example of the event propagation model.

FIG. 13A is a diagram showing an example of the configuration of a causality matrix.

FIG. 13B is a diagram showing another example of the causality matrix.

FIG. 13C is a diagram showing yet another example of the causality matrix.

FIG. 13D is a diagram showing yet another example of the causality matrix.

FIG. 14A is a diagram showing an example of the configuration of a topology creation method.

FIG. 14B is a diagram showing another example of the topology creation method.

FIG. 17 is a diagram showing an example of the configuration of deployment-target event management table.

FIG. 23 is a conceptual diagram of all the processing carried out by a management server.

DESCRIPTION OF THE EMBODIMENTS

Figure 1:
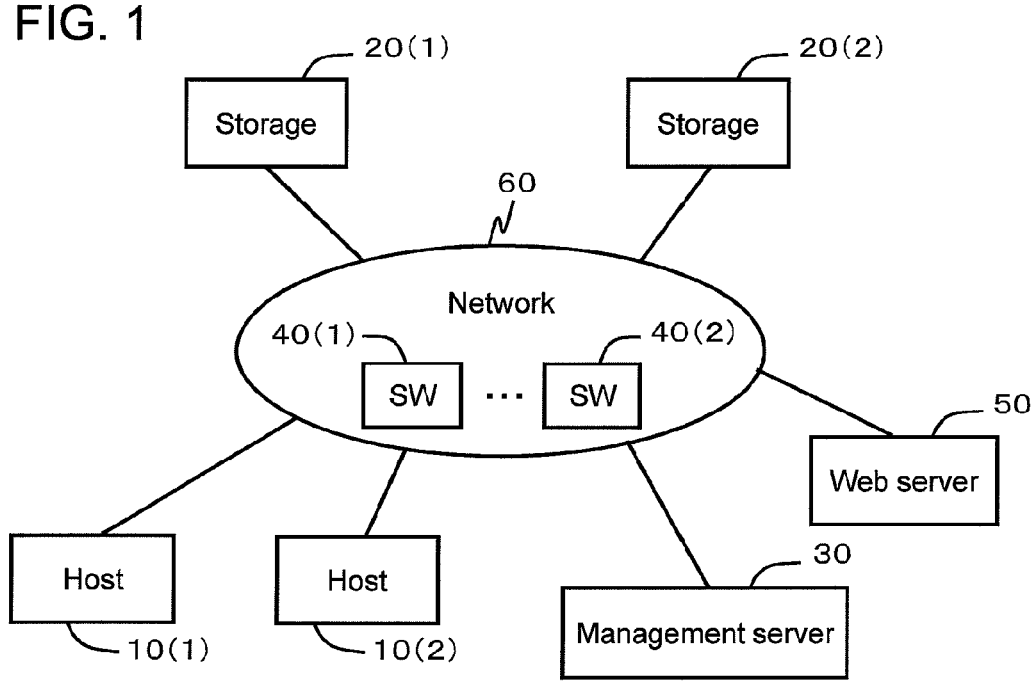
FIG. 1 is a diagram showing an example of the physical configuration of a computer system.

An embodiment of the present invention will be explained below by referring to the attached drawings. However, it should be noted that this embodiment is merely one example for realizing the present invention, and does not purport to limit the technical scope of the present invention.

In this embodiment, an event propagation model needed for redeployment is identified for each configuration change event that occurs, and only the event propagation model needed for redeployment is deployed. A deployment-target event management table is used to determine the need for redeployment. The deployment-target event management table, for example, correspondingly defines the type of event for which redeployment processing is needed from among configuration change events, and the event propagation model to be redeployed.

According to this embodiment, it is possible to carry out an event propagation model redeployment process only for a configuration change event for which an event propagation model redeployment process is needed. Therefore, the processing load for managing the system can be reduced.

In addition, in this embodiment, the contents of the deployment-target event management table are automatically updated in a case where the administrator either adds or deletes an event propagation model.

Furthermore, in this specification, information used in the embodiment is explained using the expression "aaa table", but the present invention is not limited to this, and, for example, other expressions, such as "aaa list", "aaa database" or "aaa queue" may also be used. The information used in this embodiment may also be called "aaa information" to show that this information is not dependent on a data structure.

When explaining the content of the information used in this embodiment, expressions such as "identification information", "identifier", "name" and "ID" may be used, and these expressions are interchangeable.

In addition, in the explanations of the processing operations of this embodiment, "computer program" or "module" may be described as the doer of the action (the subject). The program or the module is executed by a microprocessor. The program or the module executes a stipulated process while using a memory and a communication port (a communication control apparatus). Therefore, the processor may also be considered as the doer of the operation (the subject).

A process, which is disclosed as having a program or a module as the subject, may be regarded as a process that is carried out by a management server or other such computer. In addition, either all or a portion of the computer program may be realized in accordance with dedicated hardware. The computer program may be installed in the computer in accordance with either a program delivery server or a storage medium.

Example 1

FIGS. 1 through 5 show the overall configuration of the computer system and the configuration of each apparatus coupled to the computer system. FIGS. 6 through 14 show management information provided in each apparatus.

FIG. 1 is a diagram showing the physical configuration of a computer system. The computer system, for example, comprises a host computer 10, a storage apparatus 20, a management server 30, an IP switch 40, and a web server 50. The respective apparatuses 10, 20, 30, 40 and 50 are communicatively coupled in accordance with a communication network 60.

The host computers 10(1) and 10(2), for example, receive file I/O requests from client computers not shown in the drawing, and access storage apparatuses 20(1) and 20(2) on the basis of these I/O requests. The management server (management computer) 30 manages the operation of the computer system as a whole. Furthermore, in a case where there is no particular need to make a distinction, the host computers 10(1) and 10(2) will be called the host computer 10, and the storage apparatuses 20(1) and 20(2) will be called the storage apparatus 20.

The web server 50 communicates with a GUI (Graphical User Interface) display process module P33 of the management server 30 via the communication network 60 and displays various types of information on a WEB browser. The user manages the respective apparatuses 10, 20, and 40 inside the computer system by referring to the information displayed on the WEB browser of the web server 50.

Furthermore, the configuration may be such that information provided by the management server 30 is referenced and an instruction is issued to the management server 30 by using a portable computer, such as a mobile telephone or a handheld terminal instead of the web server 50. The configuration may also be such that the management server 30 and the web server 50 are disposed in a single server. In addition, the configuration may also be such that at least either one of the functions of the management server 30 or the functions of the web server 50 are disposed in the host computer 10.

Figure 2:
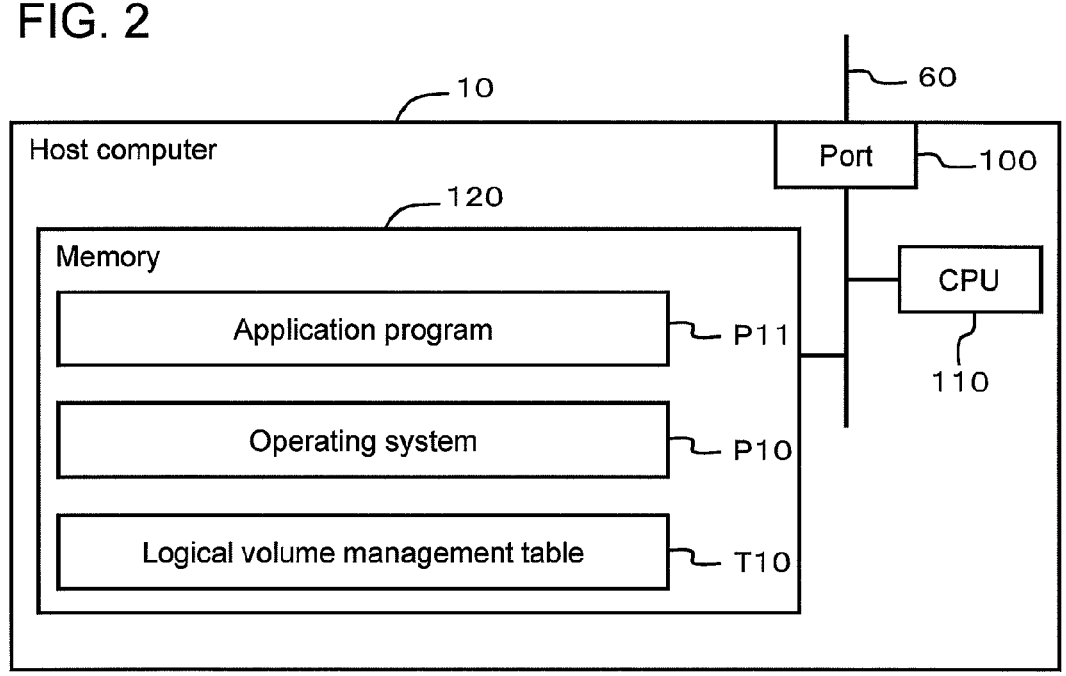
FIG. 2 a diagram showing an example of the configuration of a host computer.

FIG. 2 shows an example of the internal configuration of the host computer 10. The host computer 10, for example, comprises a communication port 100, a processor (CPU in the drawing) 110, and a memory 120. These components 100, 110 and 120 are coupled via an internal bus or the like.

The communication port (hereinafter, the port) 100 is a circuit for communication via the communication network 60. The processor 110 reads and executes various types of computer programs stored in the memory 120.

The memory 120, for example, stores an application program P11, an operating system P10, and a logical volume management table T10. The memory 120 may include a storage device like a flash memory device or a hard disk device.

The application program P11 uses a storage area provided by the operating system P10 and inputs/outputs information to/from this storage area. The application program (may also be abbreviated as application) P10, for example, is configured as a customer management program, a sales management program, or a video delivery program, and provides a service to a client computer not shown in the drawing.

The operating system P10 allows the application program P11 to recognize a logical volume 232 (refer to FIG. 3) of the storage apparatus 20 coupled to the host computer 10 as a storage area.

In FIG. 2, a port 100, which comprises both an I/O port and a management port, is described, but the configuration may also be such that the I/O port and the management port are disposed separately. The I/O port is a communication port for carrying out communications with the storage apparatus 20 using iSCSI. The management port is a communication port for the management server 30 to acquire management information from inside the host computer 10.

Figure 3:
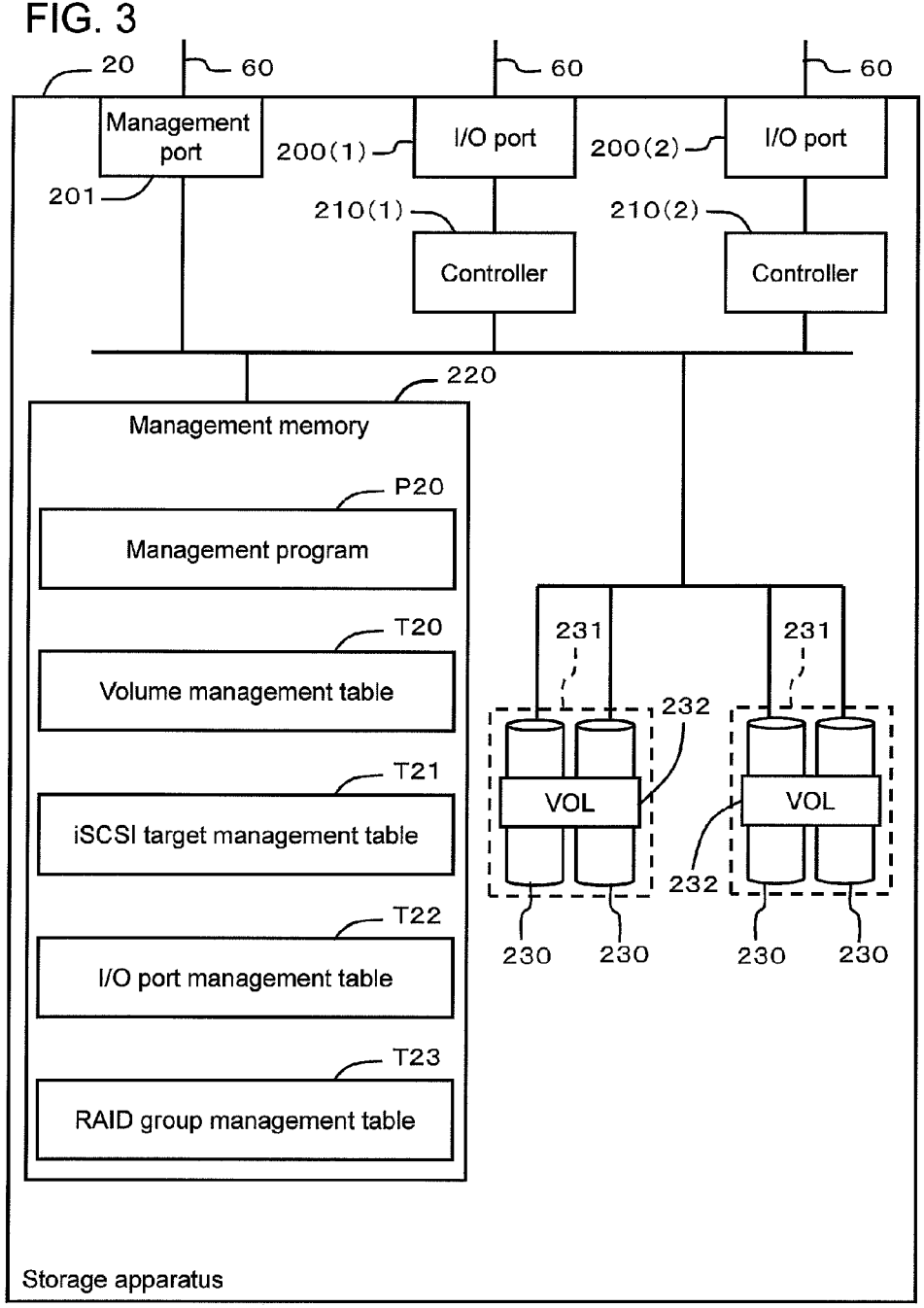
FIG. 3 is a diagram showing an example of the configuration of a storage apparatus.

FIG. 3 shows an example of the internal configuration of the storage apparatus 20. The storage apparatus 20, for example, comprises I/O ports 200(1) and 200(2), a management port 201, controllers 210(1) and 210(2), a management memory 220, and a storage device 230. These components 200, 201, 210, 220 and 230 are coupled via an internal bus or the like.

The I/O ports 200(1) and 200(2) are communication ports for coupling to the host computer 10 via the communication network 60. When no distinction is made, the I/O ports 200(1) and 200(2) will be called the I/O port 200. The management port 201 is a communication port for coupling to the management server 30 via the communication network 60.

The controllers 210(1) and 210(2) are apparatuses for controlling the operation of the storage apparatus 20. When no distinction is made, the controllers 210(1) and 210(2) will be called the controller 210.

Each controller 210 internally comprises a processor for controlling the operation of the storage apparatus 20, and a cache memory for temporarily storing data sent to and received from the host computer 10. Each controller 210 is interposed between the I/O port 200 and a RAID group 231, and transfers data between the two.

The controller 210 comprises a redundant configuration, and in a case where either one of the controllers stops, the other controller is able to take over the control of the storage apparatus 20.

The RAID group 231 comprises either one or multiple storage devices 230. It is also possible to create the RAID group 231 by making the physical storage areas of the respective multiple storage devices 230 into a RAID configuration. One or more logical volumes 232, which is a logical storage area, can be disposed in the RAID group 231.

The logical volume 232 can also be created based on the physical storage area possessed by a single storage device 230. In this case, this physical storage device does not have to be a RAID configuration.

For example, various types of storage devices capable of reading and writing data, such as a hard disk device, a semiconductor memory device, an optical disk device, and a magneto-optical disk device, can be used as the storage device 230.

In a case where a hard disk device is used as the storage device 230, for example, a FC (Fibre Channel) disk, a SCSI (Small Computer System Interface) disk, a SATA disk, an ATA (AT Attachment) disk, or an SAS (Serial Attached SCSI) disk can be used.

Also, for example, it is also possible to use various types of storage devices, such as a flash memory, a FeRAM (Ferroelectric Random Access Memory), a MRAM (Magnetoresistive Random Access Memory), an Ovonic Unified Memory, and a RRAM (Resistance RAM). In addition, for example, the configuration may also be such that different types of storage devices are used together, such as a flash memory device and a hard disk device.

The management memory 220, for example, stores a management program P20 for managing the storage apparatus, a volume management table T20, an iSCSI target management table T21, an I/O port management table T22, and a RAID group management table T23. Each management table T20, T21, T22, and T23 will be described in detail further below.

The management program P20 communicates with the management server 30 via the management port 201, and provides the configuration information of the storage apparatus 20 to the management server 30.

Furthermore, the storage apparatus 20 is not limited to the configuration shown in FIG. 3. The storage apparatus 20 may comprise a storage controller and a storage device. The storage controller, for example, may comprise a function for providing a logical volume to the host computer 10, a function for reading and writing data on the basis of an access request (I/O request) from the host computer 10, and a function for storing data temporarily. There is no need to dispose the storage controller and the storage device inside the same enclosure, and each may be disposed in a separate enclosure. Furthermore, the storage apparatus 20 may also be called the storage system.

Figure 4:
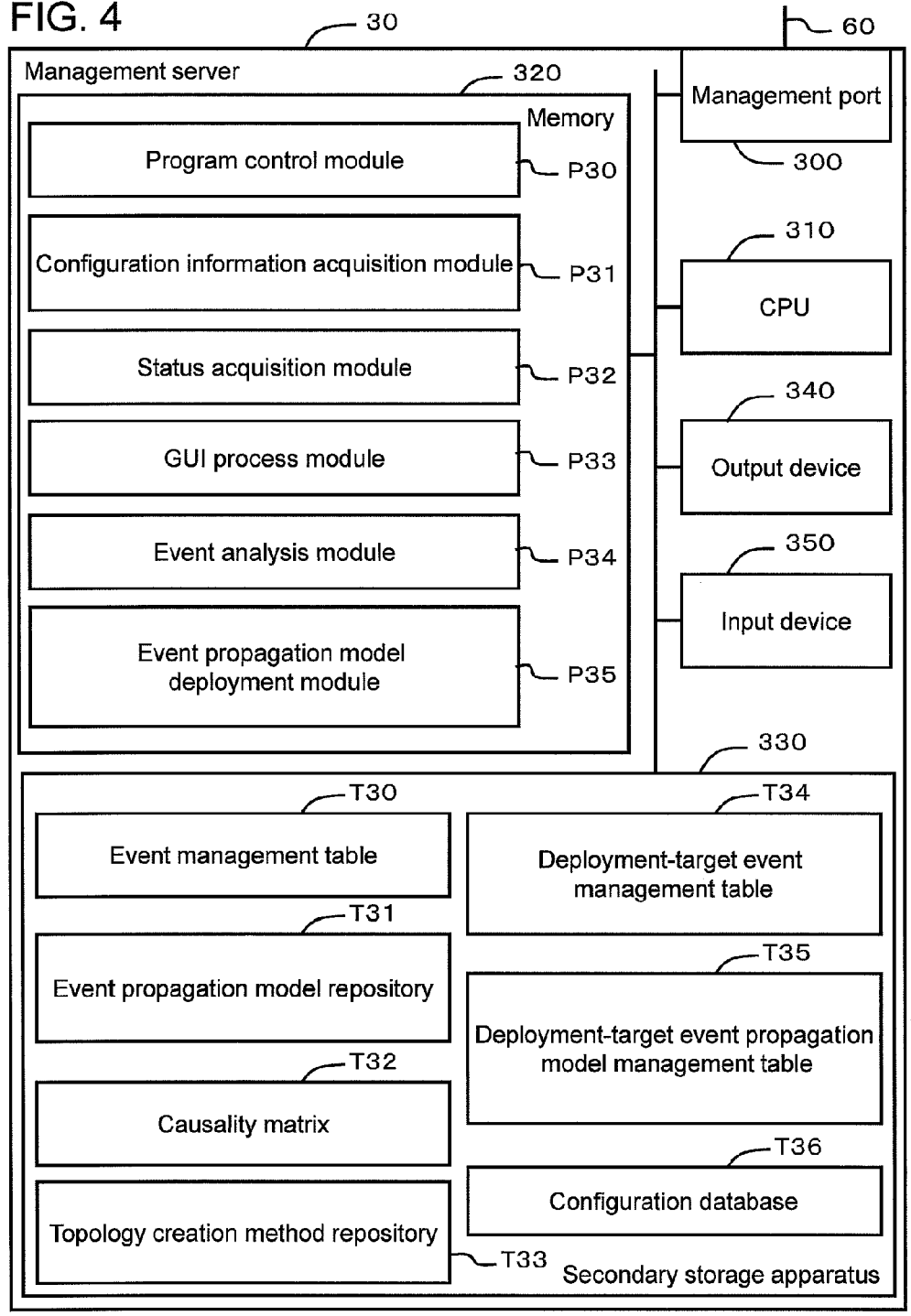
FIG. 4 is a diagram showing an example of the configuration of a management server.

FIG. 4 shows an example of the internal configuration of the management server 30. The management server 30, for example, comprises a management port 300, a processor 310, a memory 320, a secondary storage apparatus 330, an output device 340, and an input device 350, and these components 300 through 350 are coupled to one another via a circuit, such as an internal bus.

The management port 300 is a circuit for communicating with the management server 30 via the communication network 60. The processor 310 reads and executes the respective software modules P30 through P35, which will be described further below. The output device 340, for example, comprises a display, a printer, a speaker, or the like. The output device 340 outputs a processing result, which will be described further below. The input device 350, for example, comprises a keyboard, a mouse, a touch panel, a microphone or the like. The administrator (the storage administrator) issues an instruction to the management server 30 via the input device 350.

The memory 320, for example, stores a program control module P30, a configuration information acquisition module P31, a status acquisition module P32, a GUI display processing module P33, an event analysis processing module P34, and an event propagation model deployment module P35. Each module will be described in detail further below. In the drawings, the name of a module may be displayed as a partial abbreviation for convenience sake. For example, the event analysis processing module P34 is displayed as the event analysis module in the drawings.

Furthermore, in FIG. 4, each module is provided as a software module that is stored in the memory 320, but each module may be created as a hardware module instead. In addition, the processing carried out by each module may be provided as one or more program codes. In addition, a clear boundary need not exist between the modules.

The secondary storage apparatus 330, for example, stores an event management table T30, an event propagation model repository T31, a causality matrix T32, a topology creation method repository T33, a deployment-target event management table T34, a deployment-target event propagation model management table T35, and a configuration database T36. For convenience of explanation, there may be cases in which the reference sign T31 is appended to an event propagation model, and the reference sign T33 is appended to a topology creation method.

The configuration database T36 stores respective configuration information collected by the configuration information acquisition module P31. The configuration information includes information acquired from the host computer 10, and information acquired from the storage apparatus 20. The logical volume management table T10 is in the information acquired from the host computer 10. The volume management table T20, the iSCSI target management table T21, the I/O port management table T22 and the RAID group management table T23 are in the information acquired from the storage apparatus 20.

The secondary storage apparatus 330, for example, can be configured from either one or both of a flash memory device and a hard disk drive. The respective management tables T30 through T36 may be stored in the memory 320 instead of the secondary storage apparatus 330. A portion of the management tables T30 through T36 stored in the secondary storage apparatus 330 may be stored in the memory 320.

The status acquisition module P32 regularly accesses each management-target node apparatus (the host computer 10, the storage apparatus 20), and acquires the status of each component inside each node apparatus.

The event analysis processing module P34 refers to the causality matrix T32, and analyzes the root cause of a node apparatus abnormal state acquired by the status acquisition module P32.

The GUI display processing module T33 displays via the output device 340 configuration information acquired from the respective node apparatuses in response to a request from the administrator via the input device 350. The input device 350 and the output device 340 may be separate devices, or may be configured as one or more integrated devices.

Furthermore, the management server 30 may comprise a single computer, or may comprise multiple computers. In addition, a display computer may be coupled to the management server 30 instead of the output device 340 and the input device 350. The display computer comprises an input device and an output device. The administrator can acquire information from the management server 30 and issue an instruction to the management server 30 via the display computer. The display computer and the management server 30, for example, are coupled via either a wire or wirelessly. The display computer can comprise a personal computer, a mobile telephone, or a handheld terminal.

In this specification, a set of one or more computers, which manages the computer system (information processing system) and displays the display information, may be called a management system. In a case where the management server displays the display information, the management server is the management system. A combination of the management server 30 and a display computer (for example, the web server 50) is also a management system. The same processing as that of the management server may be realized using multiple computers for increasing either the speed or reliability of management processing. In this case, these multiple computers (including the display computer when the display computer carries out the displays) are the management system.

Figure 5:
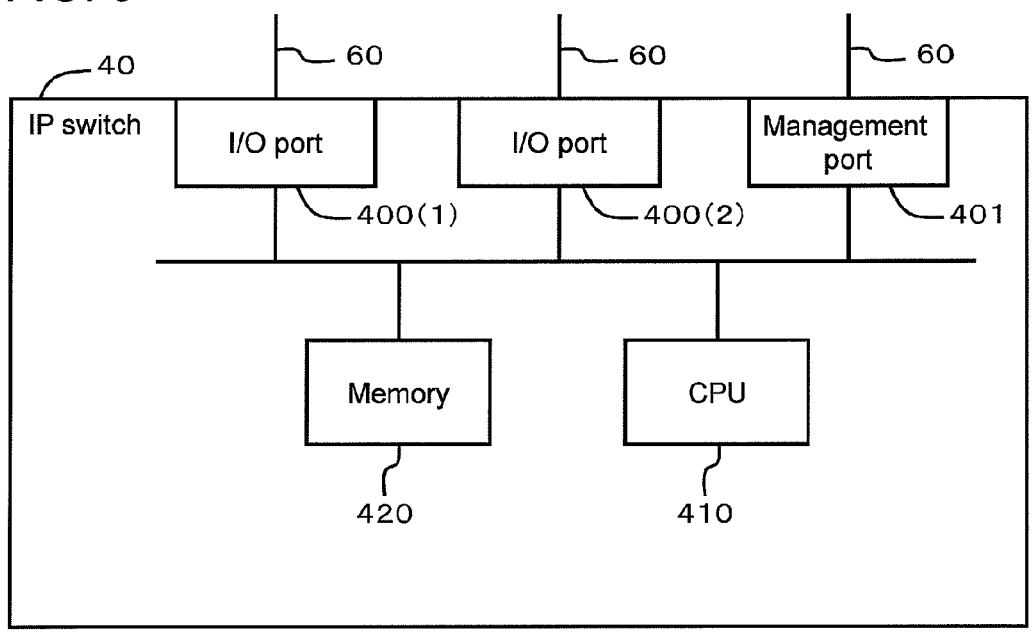
FIG. 5 is a diagram showing an example of the configuration of an IP switch.

FIG. 5 shows the configuration of the IP switch 40. The IP switch 40, for example, comprises a processor 410, a memory 420, I/O ports 400(1) and 400(2), and a management port 401, and these components 410, 420, 400, and 401, are coupled to one another via an internal bus or the like.

The memory 420, for example, stores a control program and various types of management information (none of which is shown in the drawing). The processor 410 executes the control program and controls the operation of the IP switch 40. The I/O ports 400(1) and 400(2) are coupled to the host computer 10 via the communication network 60. The management port 401 is coupled to the management server 30 via the communication network 60.

Figure 6A:
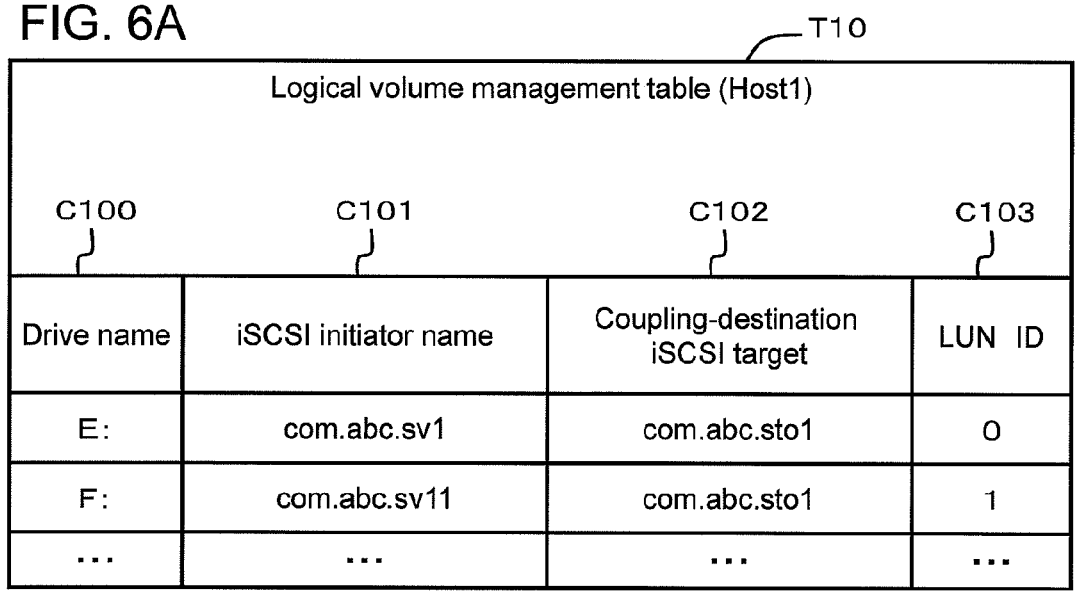
FIG. 6A is a diagram showing an example of the configuration of a logical volume management table.

FIGS. 6A, 6B and 6C show examples of configurations of the logical volume management table T10. The logical volume management table T10 is information for managing a logical volume used by the host computer 10.

The logical volume management table T10, for example, correspondingly manages the respective fields of drive name C100, iSCSI initiator name C101, coupling-destination iSCSI target C102, and LUN ID C103.

The drive name C100 is the field for registering a drive name, which becomes the identifier of each logical volume 232 inside the host computer 10. The iSCSI initiator name C101 is the field for registering the iSCSI initiator name. The iSCSI initiator is the identifier of the host computer 10 I/O port 100, which is used to communicate with the storage apparatus 20 in which the logical volume 232 exists. The coupling-destination iSCSI target C102 is the identifier of the storage apparatus 20 I/O port 200, which is used to communicate with the storage apparatus 20 in which the logical volume 232 exists. The LUN ID C103 is the field for registering the LUN (Logical Unit Number) ID, which becomes the identifier of the logical volume 232 in the storage apparatus.

FIG. 6A shows an example of specific values of the logical volume management table T10. A logical volume denoted by the drive name (E:) on the host computer is listed in the first row of FIG. 6A. This logical volume (E:) is coupled to the storage apparatus 20 via a port 100 on the host computer denoted by the iSCSI target name "com.abc.sv1" and a port 200 on the storage apparatus denoted by the iSCSI target name "com.abc.sto1. The LUN ID of "0" is assigned to the logical volume (E:) on the storage apparatus.

Figure 7A:
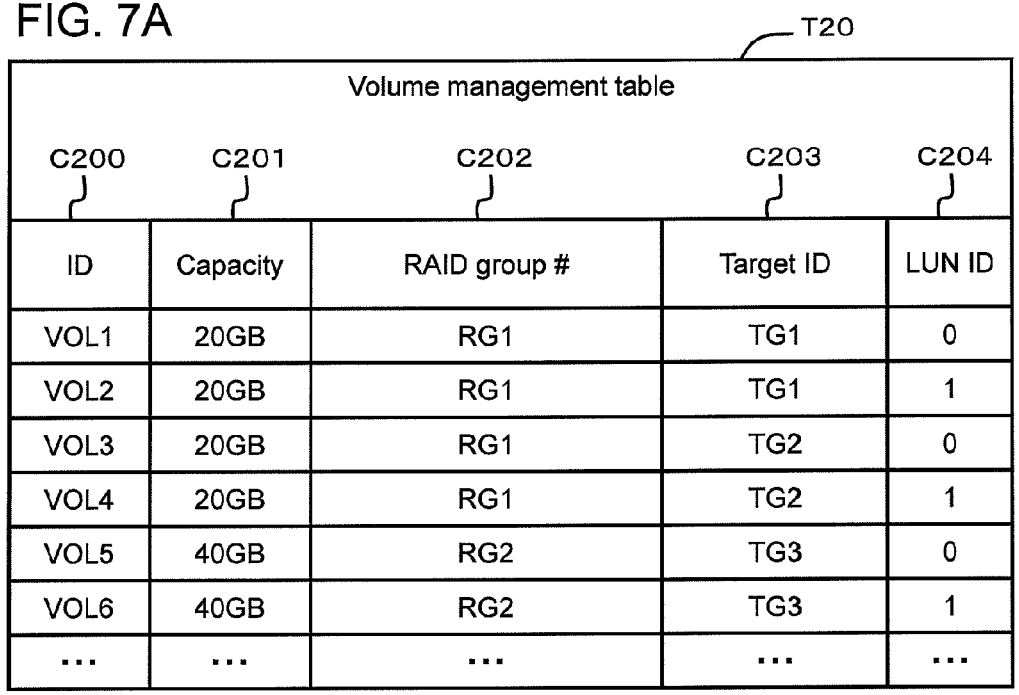
FIG. 7A is a diagram showing an example of the configuration of a volume management table.
Figure 7B:
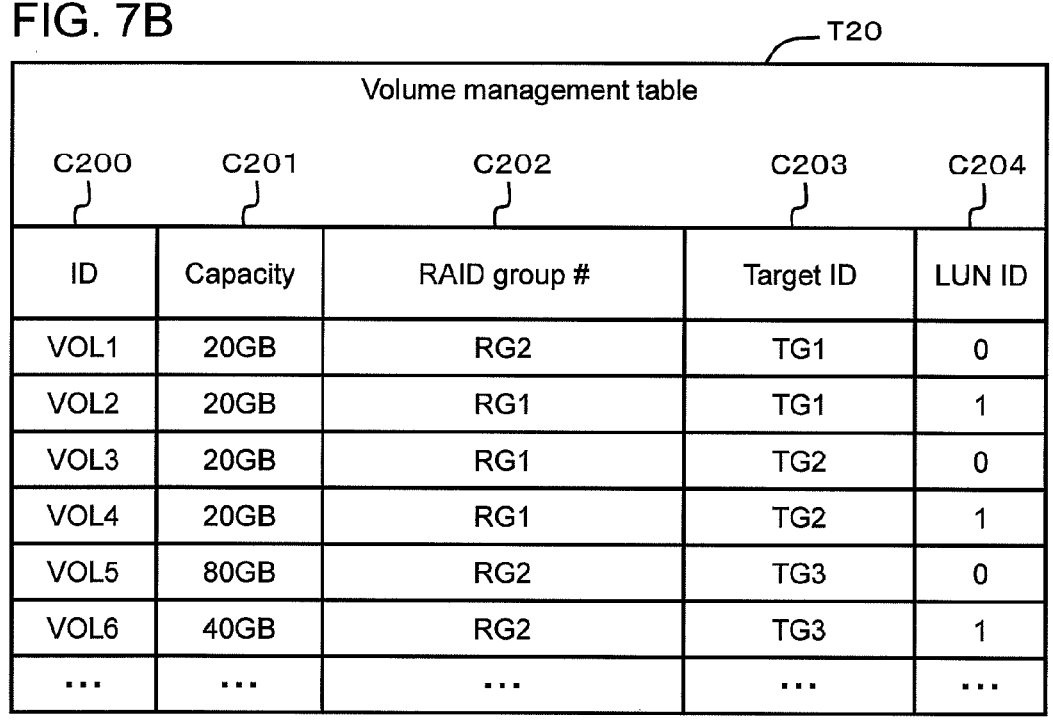
FIG. 7B is a diagram showing another example of the volume management table.

FIGS. 7A and 7B are diagrams showing the volume management table T20. The volume management table T20 manages the respective logical volumes 232 inside the storage apparatus 20.

The volume management table T20, for example, correspondingly manages the fields of volume ID C200, capacity C201, RAID group ID C202, target ID C203, and LUN ID C204.

The volume ID C200 is the identifier of each logical volume 232 of the storage apparatus 20. The capacity C201 is the capacity of each volume 232. The RAID group ID C202 is the identifier of the RAID group 231 to which each volume 232 belongs. The target ID C203 is the identifier of the iSCSI target to which each volume 232 belongs. The LUN ID C204 is the identifier of each volume 232 inside the iSCSI target.

FIG. 7A shows an example of specific values of the volume management table T20. For example, looking at the first row, the volume 232 (VOL1) has a 20 GB storage area and belongs to a RAID group 231 (RG1). In addition, this volume 232 (VOL1) belongs to a iSCSI target, which is identified using the iSCSI target ID (TG1), and has a LUN ID (0).

FIGS. 8A and 8B show the iSCSI target management table T21. The iSCSI target management table T21 manages an iSCSI target inside the storage apparatus 20. The iSCSI target management table T21, for example, correspondingly manages the fields of target ID C210, iSCSI target name C211, and coupling-allowed iSCSI initiator C212.

The target ID C210 is the identifier of the iSCSI target. The iSCSI target name C211 is the iSCSI target name of each iSCSI target. The coupling-allowed iSCSI initiator C212 is the name of the iSCSI initiator, which is allowed to couple to the iSCSI target. That is, the iSCSI initiator name, which constitutes the identifier of the host computer 10 port 100 and is allowed to access a logical volume 232 belonging to the iSCSI target, is registered in field C212.

FIG. 8A shows an example of specific value of the iSCSI target management table T21. Looking at the first row, the iSCSI target (TG1) of the storage apparatus 20 has the iSCSI target name "com.abc.sto1". In addition, this iSCSI target (TG1) is accessible from the host computer 10 port 100, which is the iSCSI initiator name "com.abc.sv1" or "com.abc.sv11".

Figure 9:
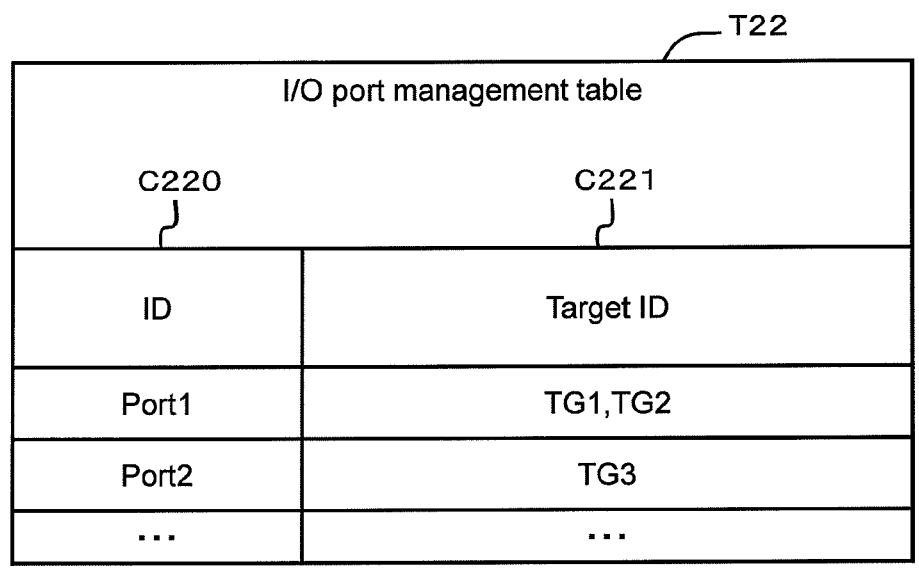
FIG. 9 is a diagram showing an example of the configuration of an I/O port management table.

FIG. 9 shows the configuration of the I/O port management table T22. The I/O port management table T22 manages the I/O port 200 of the storage apparatus 20. The I/O port management table T22, for example, correspondingly manages the fields of port ID C220, and target ID C221.

The port ID C220 is the identifier of each port 200 of the storage apparatus 20. The target ID C221 is a MAC address, which constitutes the identifier of the port 200 on the communication network 60.

FIG. 9 shows an example of specific values of the I/O port management table T22. Looking at the first row, the port 200 of the storage apparatus 20 (PORT1) is used by iSCSI targets, which are identified by the iSCSI target IDs TG1 and TG2.

Figure 10:
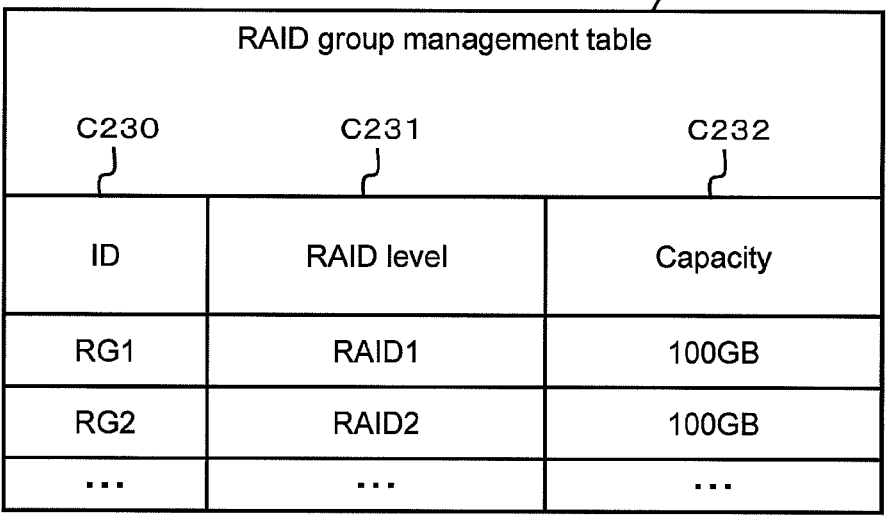
FIG. 10 is a diagram showing an example of the configuration of a RAID group management table.

FIG. 10 shows the configuration of the RAID group management table T23. The RAID group management table T23 manages the respective RAID groups 231 inside the storage apparatus 20. The RAID group management table T23, for example, correspondingly manages the fields of RAID group ID C230, RAID level C231, and capacity C232.

The RAID group ID C230 is the identifier of each RAID group 231 inside the storage apparatus. The RAID level C231 is the RAID level of the RAID group 231. For example, RAID1, RAID2, RAID3, RAID4, RAID5, and RAID6 are known as RAID levels. The capacity C232 is the capacity of the RAID group 231.

FIG. 10 shows an example of specific values of the RAID group management table T23. Looking at the first row, the RAID level of the RAID group 231 (RG1) is RAID1, and, in addition, the capacity is 100 GB.

FIG. 11 is a diagram showing an example of the configuration of the event management table T30. The event management table T30 manages events, which have occurred in the respective apparatuses under the management of the management server 30. The event management table T30, for example, correspondingly manages the fields of event ID C300, apparatus ID C301, component ID C302, parameter C303, status C304, processed flag C305, and date/time C306.

The event ID C300 is the identifier of an event. The occurrence of an event, as will be described further below, is determined based on a change in the configuration information. The apparatus ID C301 is the identifier of the apparatus (machine) in which an event has occurred. The component ID C302 is the identifier for identifying the component in which an event has occurred inside the apparatus. The parameter C303 is the name of the parameter, which detected a change in the configuration information. The status C304 shows the type of change in the configuration information. The types of statuses, for example, include "change", "addition", and "deletion". The processed flag C305 shows whether or not an event has been processed in accordance with the event propagation model deployment module P35, which will be described further below. The date/time C306 is the date and time at which the event occurred.

For example, look at the first row (the first entry). The fact that the management server 30 detected as an event (EV1) a change in the iSCSI initiator, which is capable of coupling to the iSCSI target (TG1) of the storage apparatus 20 (SYS1), is recorded here.

FIGS. 12A and 12B shows examples of the configuration of an event propagation model inside the event propagation model repository T31. The event propagation model is an example of a "prescribed analysis rule". Generally speaking, an event propagation model for identifying a root cause in a problem analysis lists in an IF-THEN format the combination of events for which a certain problem (cause) is expected to be generated as a result, and the root cause thereof.

In this embodiment, for the sake of convenience, two event propagation models will be explained as shown in FIGS. 12A and 12B. The present invention is not limited to these two event propagation models, and more event propagation models (rules) may be prepared. The event propagation model, for example, correspondingly manages the fields of model ID C310, observed event C311, and cause C312.

The model ID C310 is the identifier of the event propagation model. The observed event C311 denotes multiple related events, which are observed as the results of a certain cause. The observed event corresponds to the IF part of the event propagation model, which is listed in the IF-THEN format. The cause C312 is the causal event of the observed events. The causal event (causal event) corresponds to the THEN part of the event propagation model, which is listed in the IF-THEN format.

The relationship is such that, in a case where an event in the cause C312, which is the conclusion part, is normal, the status in the observed event C311, which is the condition part, also returns to normal.

FIG. 12A shows an example of specific values of the event propagation model. In a certain event propagation model (Rule1), when an ERROR in a logical volume on the host computer 10 and an ERROR in the I/O port 200 of the storage apparatus 20 are detected, it is concluded that a failure in the I/O port 200 of the storage apparatus 20 is the cause.

FIGS. 13A, 13B, 13C and 13D show configurations of the causality matrix T32. The causality matrix T32 stipulates a specific cause-effect relationship of problem events that occur in the respective apparatuses of the computer system. The causality matrix T32, for example, correspondingly manages the fields of event propagation model ID C320, observed event C321, causal event C322, and cause-effect relationship C323.

The event propagation model ID C320 is the identifier of the event propagation model that was used in a deployment process. The observed event C321 registers an event (a problem event), which the status acquisition module P32 of the management server 30 is able to receive from each management-target apparatus. The causal event C322 registers the causal event, which the event analysis processing part P34 concluded to be the cause of the problem when the problem event was received. The cause-effect relationship C323 registers the corresponding relationship, which determines the event that is the root cause when events have been received.

FIG. 13A shows an example of specific values of the causality matrix T32. For example, when two events, i.e., an ERROR in a volume (VOL1) of the storage apparatus 20 (SYS1) and an ERROR in a logical volume (E:) of the host 10 (HOST1), have been detected, a determination is made that a failure in the volume (VOL1) of the storage apparatus 20 (SYS1) is the root cause.

FIG. 14 shows an example of the configuration of the topology creation method inside the topology creation method repository T33. The topology creation method defines a method for creating a coupling relationship (topology) between the respective management-target apparatuses based on configuration information acquired from each management-target apparatus.

The topology creation method, for example, correspondingly manages the fields of topology ID C330, origination component C331, termination component C332, via component C333, and topology creation condition C334.

The topology ID C330 is the topology identifier. The origination component C331 is the type of component inside the node apparatus, which constitutes the point of origin of the topology. The termination component C332 is the type of component inside the node apparatus, which constitutes the terminal point of the topology. The via component C333 is the type of component inside the node apparatus through which a topology passes when a topology is created from the origination component to the termination component. The topology creation condition C334 is the method for creating a topology from the origination component to the termination component.

FIG. 14A shows an example of specific values of the topology creation method T33. FIG. 14A lists a topology, which has the logical volume of the host computer 10 as the point of origin, the I/O port 200 of the storage apparatus 20 as the terminal point, and, in addition, which passes through the iSCSI target of the storage apparatus 20. This topology is acquirable by searching for a combination in which the iSCSI initiator name of the logical volume is equivalent to the coupling-allowed iSCSI initiator of the iSCSI target, and, in addition, a combination in which the iSCSI target ID inside the I/O port 200 is equivalent to the ID inside the iSCSI target.

Figure 22:
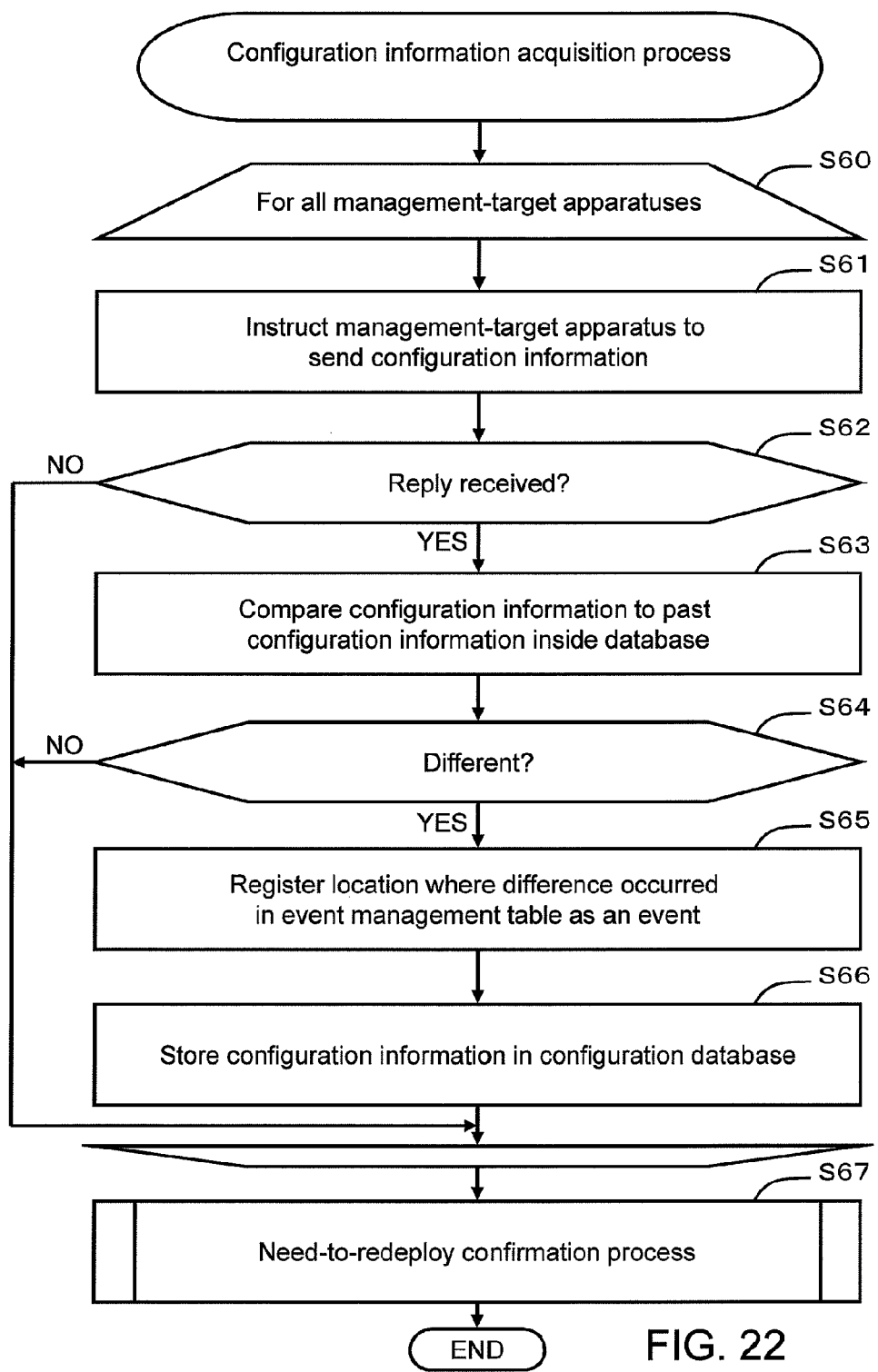
FIG. 22 is a flowchart of a configuration information acquisition process.

The process for acquiring the configuration information will be explained by referring to the flowchart of FIG. 22. The configuration information acquisition process is carried out by the configuration information acquisition module P31 of the management server 30. A step may be abbreviated as "S" below.

The program control module P30 instructs the configuration information acquisition module P31 to execute the configuration information acquisition process at a prescribed timing. The prescribed timing, for example, can be either the time at which the program control module P30 is booted up, or a fixed period of time after the previous configuration information acquisition process. Furthermore, there is no need for instructions to be issued each time a prescribed period of time has passed; it is sufficient to execute the configuration information acquisition process repeatedly.

The configuration information acquisition module P31 repeats the following S61 through S66 for each management-target apparatus (S60). First or all, the configuration information acquisition module P31 instructs the management-target apparatus to send configuration information (S61). The configuration information acquisition module P31 determines whether or not there was a reply from the management-target apparatus (S62).

In a case where the management-target apparatus has replied with the configuration information (S62: YES), the configuration information acquisition module P31 compares the acquired configuration information to past configuration information stored in the configuration database T36 (S63). In a case where the management-target apparatus has not replied with the configuration information (S62: NO), the configuration information acquisition module P31 ends the configuration information acquisition process.

The configuration information acquisition module P31 determines whether or not there is a difference between the acquired configuration information and the past configuration information stored in the configuration database T36 (S64). That is, a determination is made as to whether or not the current configuration information and the past configuration information are different.

In a case where there is a difference between the current configuration information and the past configuration information (S64:YES), the configuration information acquisition module P31 treats the location where the difference occurred as an event, and registers this event in the event management table T30 (S65). Treatment as an event signifies that the configuration in which the difference occurred will be handled as an event.

The configuration information acquisition module P31 stores the configuration information acquired in S62 (the current configuration information) in the configuration database T36 (S66).

After completing the above processing of S61 through S66 for all of the management-target apparatuses, the configuration information acquisition module P31 executes a process for confirming whether or not the event propagation model should be redeployed (S67). The preceding is the configuration information acquisition process carried out by the configuration information acquisition module P31.

A need-to-redeploy confirmation process, which does not comprise the characteristic features of this embodiment, will be explained by referring to FIG. 15 to clarify the difference with this embodiment. That is, the flowchart of FIG. 15 is a comparative example.

The need-to-redeploy confirmation process is for determining whether or not the causality matrix will be recreated by deploying the event propagation model.

Figure 15:
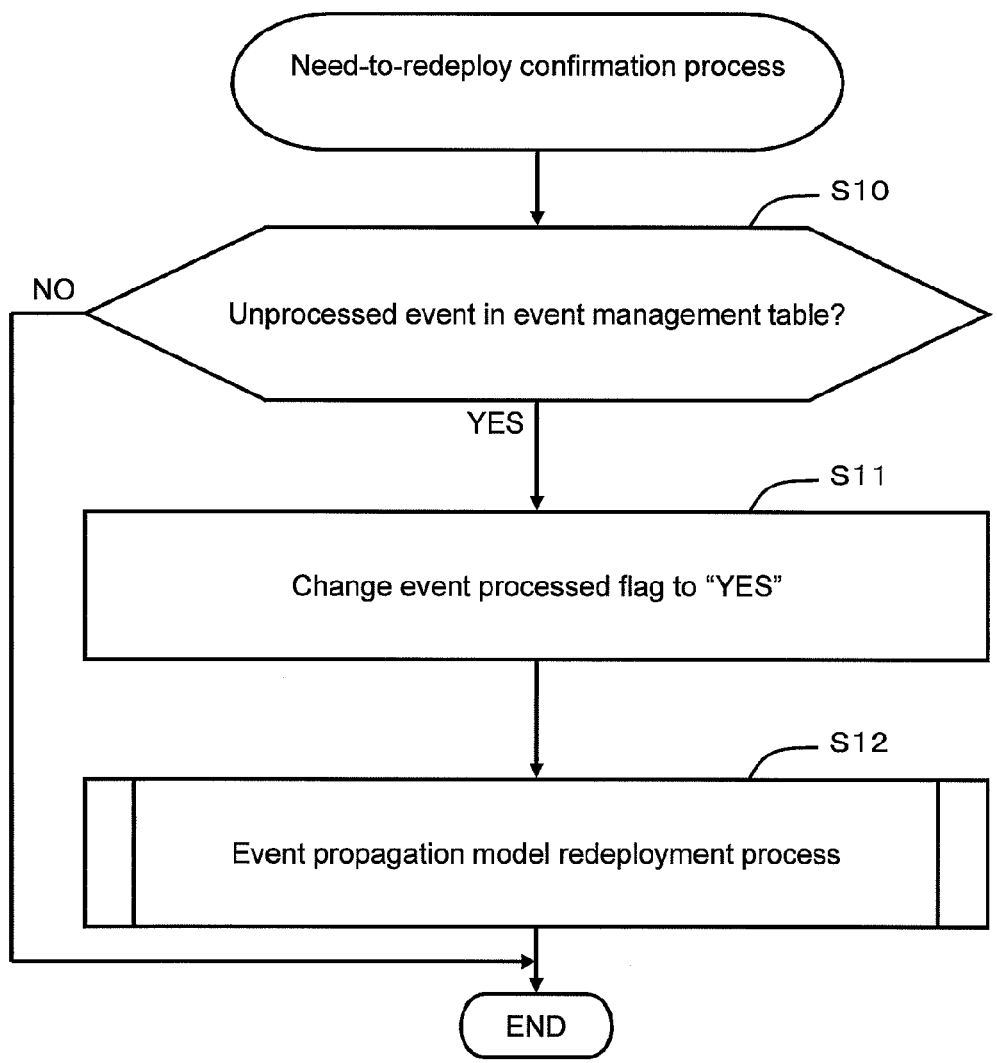
FIG. 15 is a comparative example flowchart of a need-to-redeploy confirmation process.

In the case of the comparative example shown in FIG. 15, a determination is made as to whether or not there is an unprocessed event in the event management table T30 (S10).

Figure 16:
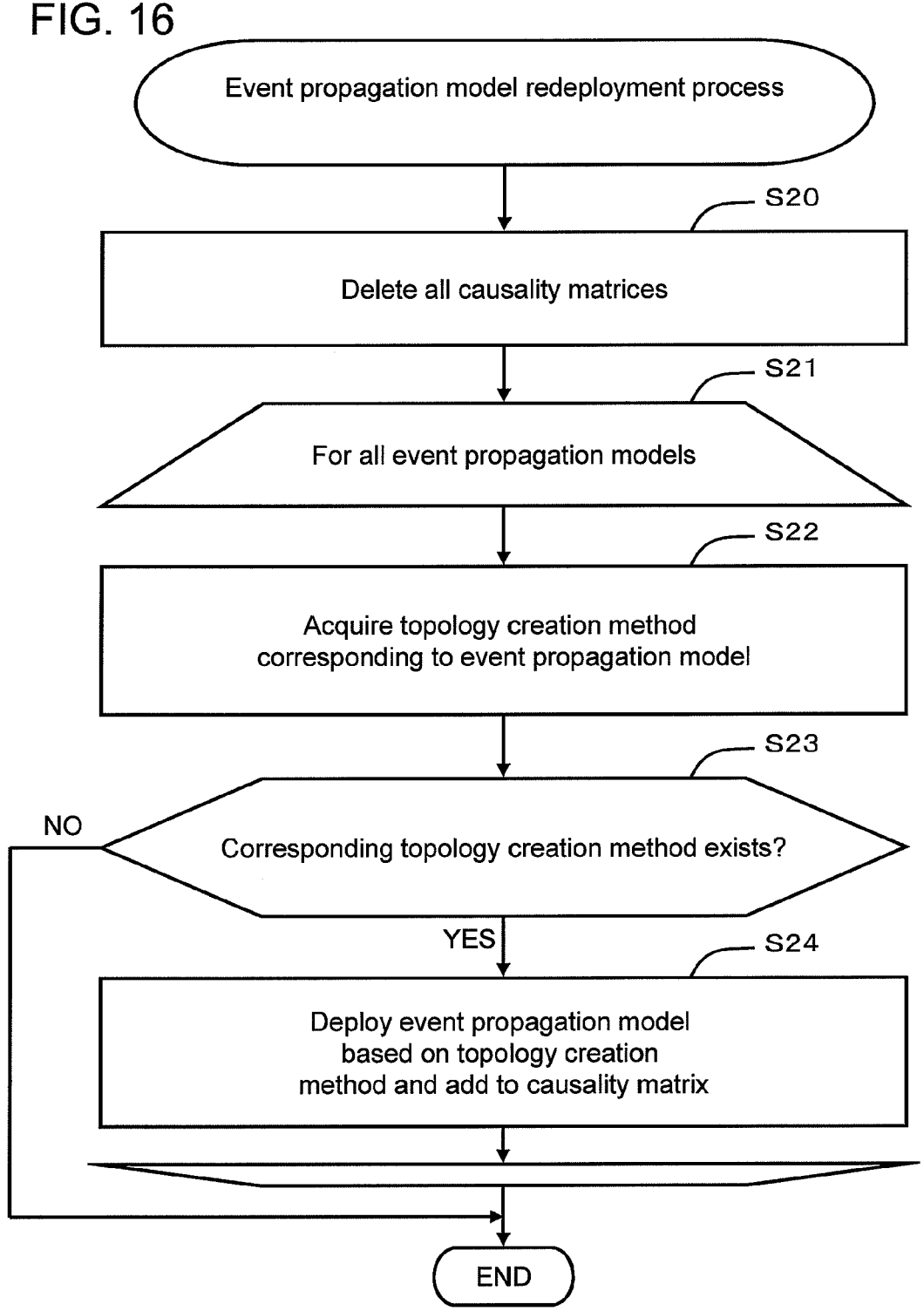
FIG. 16 is a comparative example flowchart of an event propagation model redeployment process.

In a case where an unprocessed event exists (S10:YES), the value of the processed flag C305 of this unprocessed event is changed to "YES" (S11). Thereafter, the process for redeploying the event propagation model shown in FIG. 16 is executed (S12).

In this way, in the comparative example, which does not comprise the characteristic feature of this embodiment, the processing for redeploying the event propagation model is executed each time the computer system configuration changes. Therefore, the processing load on the management server 30 increases.

An event propagation model redeployment process, which does not comprise the characteristic feature of this embodiment, will be explained by referring to the flowchart of FIG. 16. That is, the flowchart of FIG. 16 is a comparative example.

First, all the causality matrices are deleted (S20). Next, the following series of processes S23 through S24 are repeated for all the event propagation models defined in the event propagation model repository (S21).

The topology creation method corresponding to the event propagation model is acquired from the topology creation method repository (S22). When the corresponding topology creation method is acquirable (S23: YES), a topology is acquired from the configuration database based on this topology creation method (S24). In addition, the event propagation model is deployed and the causality matrix is added to this acquired topology (S24).

For example, the event propagation model (Rule1) shown in FIG. 12A defines as the observed event an "ERROR in the logical volume of the host computer" and an "ERROR in the I/O port of the storage apparatus".

Refer to the topology creation method shown in FIG. 14A. In FIG. 14A, a topology creation method (TP1), which makes the host computer logical volume the origination component and the storage apparatus I/O port the termination component, is defined. Accordingly, this topology creation method (TP1) is used to acquire a topology.

The logical volume management table T10 shown in FIG. 6A is referenced, and the logical volume (E:) of the host computer 10 (HOST1) is observed. The iSCSI initiator name of the logical volume (E:) is "com.abc.sv1".

Next, the iSCSI target management table T21 shown in FIG. 8 is referenced, and the iSCSI target TG1 for which the coupling-destination iSCSI initiator name is "com.abc.sv1" is retrieved. The I/O port management table T22 shown in FIG. 9 is referenced, and the I/O port 200 (PORT1) for which the iSCSI target ID is TG1 is retrieved.

As a result of carrying out the above processing, a combination of the host computer 10 (HOST1) logical volume (E:) and the storage apparatus 20 (SYS1) I/O port 200 (PORT1) is detected as one topology comprising the host computer logical volume and the storage apparatus I/O port.

Consequently, a new causality matrix is created. This causality matrix, in a case where an "ERROR in the logical volume (E:) of the host computer 10 (HOST1)" and an "ERROR in the I/O port 200 (PORT1) of the storage apparatus 20 (SYS1)" are detected as the observed events, assumes that a "failure of the I/O port 200 (PORT1) of the storage apparatus 20 (SYS1)" is the cause.

The above processing of S22 through S24 is executed by having all of the logical volumes in the host computer 10 defined in the logical volume management table T10 as the origination components. The preceding is a comparative example of the event propagation model redeployment process.

In this way, in the comparative example, the event propagation model is redeployed each time a configuration change is detected in the management-target apparatus. Therefore, the in a case where the management server 30 manages numerous apparatuses, like at a large-scale data center, large numbers of configuration changes occur, and the amount of data for managing the management-target apparatuses also increases. As a result, the process for redeploying the event propagation model is executed relatively frequently, increasing the processing load on the management server 30.

Consequently, this embodiment improves the need-to-redeploy confirmation process and the event propagation model redeployment process based on a unique concept.

Figure 18:
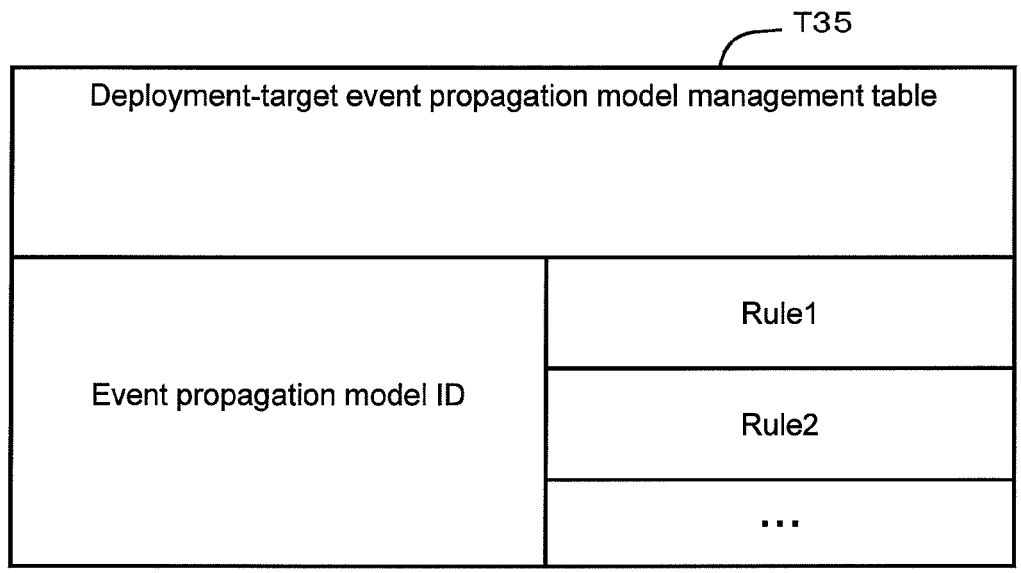
FIG. 18 is a diagram showing an example of the configuration of deployment-target event propagation model management table.
Figure 19:
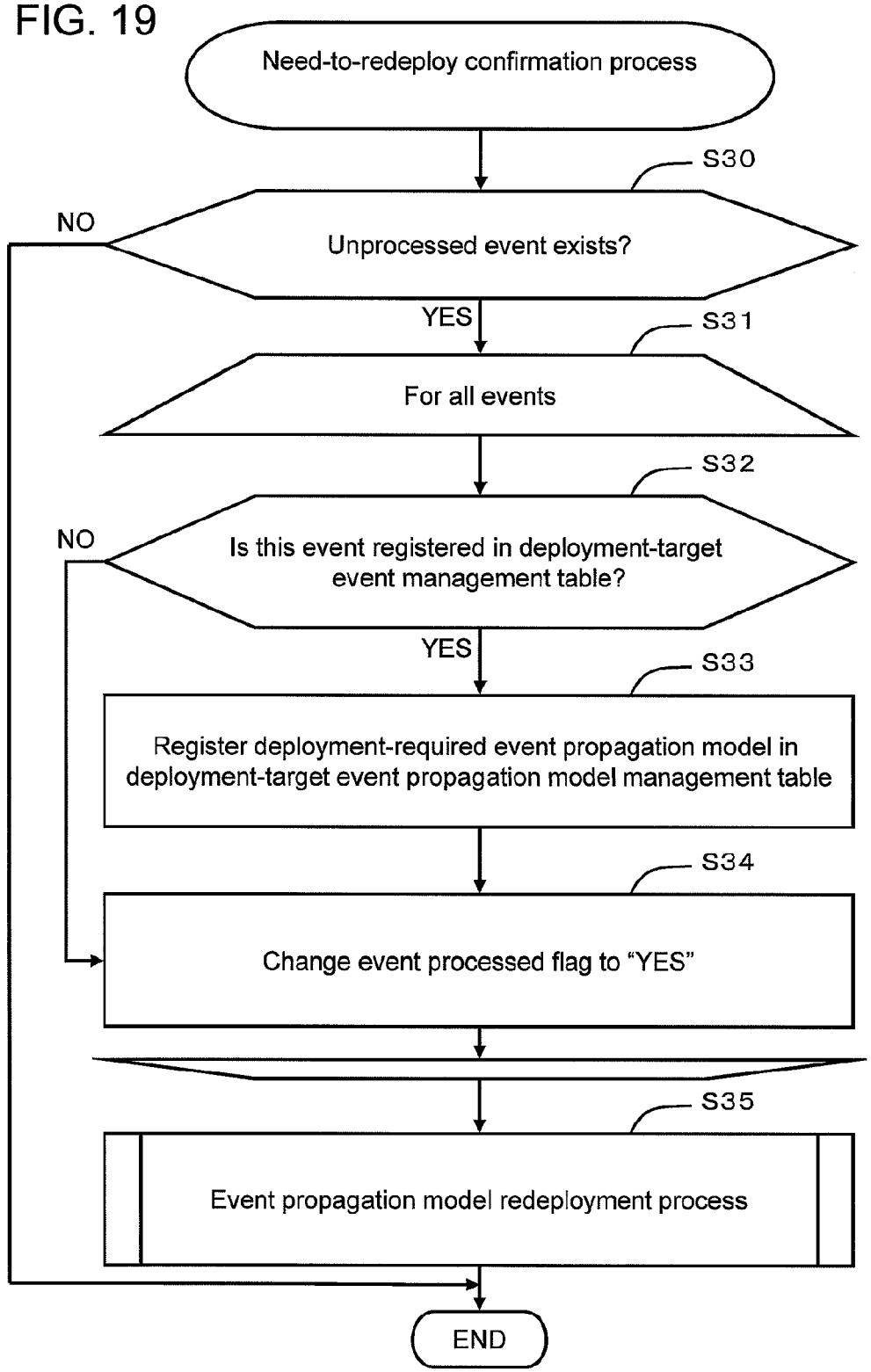
FIG. 19 is a flowchart of a need-to-redeploy confirmation process.
Figure 20:
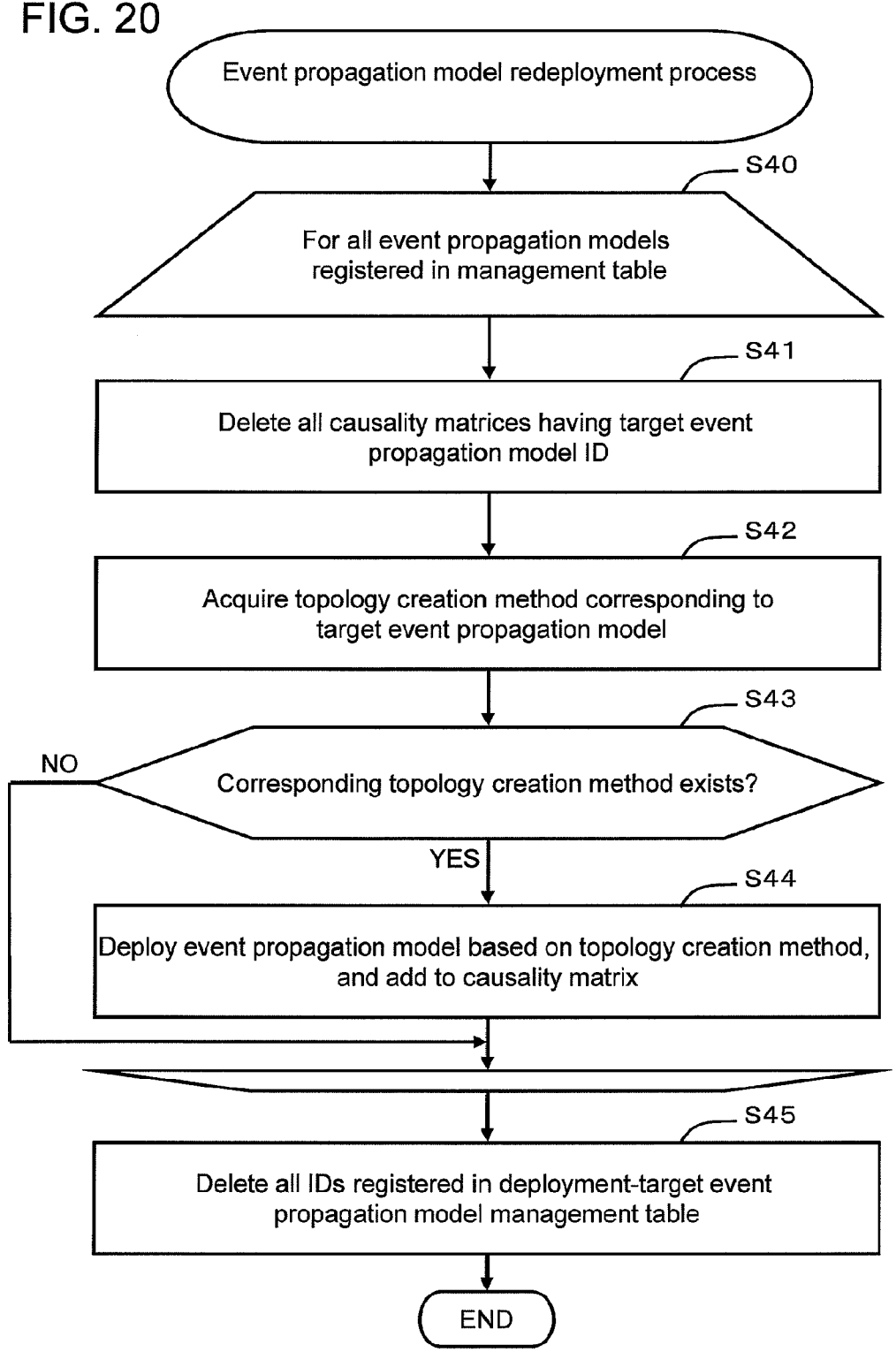
FIG. 20 is a flowchart of an event propagation model redeployment process.

FIG. 17 shows the deployment-target event management table T34 specific to this embodiment. In addition, FIG. 18 shows the deployment-target event propagation model management table T35 specific to this embodiment. In addition, FIGS. 19 and 20 show the operation of the management server 30 in accordance with this embodiment.

The deployment-target event management table T34 may be defined manually by the administrator, or may be created automatically in accordance with a method shown in a second example, which will be described further below.

FIG. 17 shows an example of the configuration of the deployment-target event management table T34 as one example of "target event management information". The deployment-target event management table T34 manages an event for which an event propagation model must be deployed. The deployment-target event management table T34, for example, correspondingly manages the fields of machine type C340, component type C341, parameter C342, event type C343, and event propagation model ID C344.

The machine type C340 is the type of apparatus in which a configuration-change event has occurred. The component type C341 is the type of component inside the apparatus in which the configuration-change event has occurred. The parameter C342 is the name of the parameter in which the configuration information change was detected. The event type C343 is the type of the configuration information change. Changes in configuration information, for example, include "addition", "deletion", and "change". An event related to these configuration changes (addition, deletion, change) will be called a configuration change event here. The event propagation model ID C344 is the identifier of the event propagation model to be applied to the configuration change event.

FIG. 17 shows an example of specific values of the deployment-target event management table T34. For example, in a case where the value of the iSCSI initiator, which is allowed to couple with the iSCSI target of the storage apparatus, has been changed, an event propagation model (Rule1) is redeployed with respect to this configuration change event. In a case where an event that is not listed in the deployment-target event management table T34 occurs, the redeployment of the event propagation model is not carried out.

FIG. 18 shows an example of the configuration of the deployment-target event propagation model management table T35. The deployment-target event propagation model management table T35 defines the event propagation model that will be the deployment target. The deployment-target event propagation model management table T35 has a field for registering which event propagation model will become the deployment target.

FIG. 18 shows a specific example. One certain event propagation model (Rule1) and one other event propagation model (Rule2) are the targets of the redeployment.

FIG. 19 shows a flowchart of the need-to-redeploy confirmation process carried out by the configuration information acquisition module P31.

The configuration information acquisition module P31 refers to the event management table T30 and confirms whether an unprocessed event exists or not (S30). The unprocessed event is an event, which denotes a configuration change and which is set to "NO" in the processed flag C305.

In a case where an unprocessed event exists (S30: YES), the configuration information acquisition module P31 repeats the processing of S32 through S34 in a loop with respect to this unprocessed event (S31).

The configuration information acquisition module P31 checks whether or not an event of the same type as the unprocessed event is registered in the deployment-target event management table T34 (S32).

In a case were an event of the same type as the unprocessed event is registered in the deployment-target event management table T34 (S32: YES), the configuration information acquisition module P31 registers the deployment-required rule defined in the deployment-target event management table T34 in the deployment-target event propagation model management table T35 (S33). Lastly, the configuration information acquisition module P31 changes the unprocessed event processed flag C305 to "YES" (S34).

After ending the above processing, the configuration information acquisition module P31 instructs the event propagation model deployment module P35 to carry out the event propagation model redeployment process shown in FIG. 20. The preceding is the need-to-redeploy confirmation process in accordance with this embodiment. In this embodiment, of the events showing a configuration change, the event propagation model redeployment process is targeted only at the event registered in the deployment-target event management table T34. Therefore, the load on the management server 30 can be reduced.

FIG. 20 shows a flowchart of the event propagation model redeployment process carried out by the event propagation model deployment module P35.

The event propagation model deployment module P35 repeats the following series of processes S41 through S44 with respect to all the event propagation models defined in the deployment-target event propagation model management table T35 (S40). Furthermore, in a case where there are no IDs registered in the deployment-target event propagation model management table T35, this processing is ended without carrying out the following processes S41 through S44.

Hereinafter, the process-target event propagation model will be called the target event propagation model. The event propagation model deployment module P35 deletes all the causality matrices T32 having the target event propagation model ID (S41). The event propagation model deployment module P35 refers to the topology creation method repository T33, and acquires a topology creation method corresponding to the target event propagation model from the topology creation method repository T33 (S42).

In a case where a corresponding topology creation method exists (S43: YES), the event propagation deployment module P35 acquires the topology from the configuration database T36 based on this topology creation method. The event propagation deployment module P35 applies the event propagation model to this topology, and adds this topology as a row of the causality matrix T32 (S44).

The event propagation model deployment module P35 deletes all the IDs defined in the deployment-target event propagation model management table T35 after the above processing S41 through S44 has ended with respect to all the event propagation models defined in the deployment-target event propagation model management table T35 (S45). The preceding is the event propagation model redeployment process.

A specific example of the configuration information acquisition process is shown below. At the start of processing, the causality matrix T32 related to the event propagation model T31 (Rule1) is as shown in FIG. 13A, the causality matrix T32 related to the event propagation model T31 (Rule2) is as shown in FIG. 13C, the RAID group management table T23 is as shown in FIG. 10, and the iSCSI target management table T21 is as shown in FIG. 8A.

The program control module P30 instructs the configuration information acquisition module P31 to execute the configuration information acquisition process in accordance with either an instruction from the administrator or a scheduled setting in accordance with a timer. The configuration information acquisition module P31 sequentially logs in to each of the apparatuses under management and instructs these apparatuses to send configuration information corresponding to the type of apparatus.

After completing the above processing, the configuration information acquisition module P31 compares the past configuration information stored in the configuration database T36 to the current configuration information acquired from each management-target apparatus, and updates the event management table T30.

A case in which the iSCSI initiator, which is allowed to couple with the iSCSI target (TG1) of the storage apparatus 20 (SYS1), has changed as shown in the first row of the event management table T30 of FIG. 11 will be assumed here. Furthermore, FIG. 8B shows the post-change iSCSI target management table T21.

The configuration information acquisition module P31 carries out the following processing with respect to the event defined in the event management table T30. First of all, the configuration information acquisition module P31 refers to the deployment-target event management table T34, and checks whether or not an event of the same type as the event registered in the event management table T30 is defined.

The same type, as used here, denotes that the apparatus type, the in-apparatus component type, the parameter name, and the status change type are all the same. In a case where the same type event exists in the deployment-target event management table T34, the configuration information acquisition module P31 registers the rule (event propagation model) defined in the event propagation model ID C344 of the deployment-target event management table T34 in the deployment-target event propagation model management table T35.

For example, a "change in the iSCSI initiator, which is allowed to couple with the storage apparatus iSCSI target" is defined as one type of redeployment-required event in the deployment-target event management table T34 shown in FIG. 17. The configuration information acquisition module P31 registers the event propagation model ID (Rule1) corresponding to this event type in the deployment-target event propagation model management table T35.

After completing the above processing, the configuration information acquisition module P31 instructs the event propagation model deployment module P35 to carry out an event propagation redeployment process. The event propagation model deployment module P35 refers to the deployment-target event propagation model management table T35, and carries out redeployment processing with respect to Rule1 registered in the deployment-target event propagation model management table T35.

That is, the event propagation model deployment module P35 deletes the row in which the event propagation model ID is Rule1 from causality matrix T32. Next, the event propagation model deployment module P35 deploys the event propagation model (Rule1), and adds this event propagation model (Rule1) to the causality matrix T32. The deployment method is the same method that was described using FIG. 20.

The causality matrix T32 related to the event propagation model (Rule1) is updated in accordance with the above processing, and changes from the state shown in FIG. 13A to the state shown in FIG. 13B.

Next, a case in which the ID of the RAID group 231 to which the storage apparatus 20 (SYS1) volume 232 (VOL1) belongs is changed as shown in the second row of the event management table T30 of FIG. 11 will be assumed. FIG. 7B shows the post-change volume management table T20.

The following process is executed with respect to the event related to the configuration change defined in the event management table T30. The deployment-target event management table T34 is referenced, and a check is made as to whether or not an event of the same type as the event defined in the event management table T30 is defined in the management table T34.

In a case where the same type event is defined in the deployment-target event management table T34, the event propagation model (rule) defined in the event propagation model ID C344 of the deployment-target event management table T34 is registered in the deployment-target event propagation model management table T35.

For example, a "change of RAID group ID related to the storage apparatus volume" is defined in the deployment-target event management table T34 shown in FIG. 17 as a type of event for which redeployment is needed. The configuration information acquisition module P31 registers the Rule2, which is the event propagation model ID corresponding to this event type, in the deployment-target event propagation model management table T35.

After completing the above processing, the configuration information acquisition module P31 instructs the event propagation model deployment module P35 to carry out the event propagation model redeployment process. The event propagation model deployment module P35 refers to the deployment-target event propagation model management table T35 and carries out the redeployment process with respect to Rule2, which is registered in the deployment-target event propagation model management table T35.

That is, the row in which the event propagation model ID is Rule2 is deleted from the causality matrix T32. Next, the event propagation model (Rule2) is deployed and added to the causality matrix T32. The deployment method is the same method as that described using FIG. 20.

The causality matrix T32 related to the event propagation model (Rule2) is updated in accordance with the above processing, and changes from the state shown in FIG. 13C to the state shown in FIG. 13D.

Now then, a case in which the capacity of the volume 232 (VOL5) of the storage apparatus 20 (SYS1) is changed as shown in the third row of the event management table T30 of FIG. 11 will be assumed. An event of the same type as a capacity change event is not defined in the deployment-target event management table T34. Therefore, the configuration information acquisition module P31 does not instruct the event propagation model deployment module P35 to carry out the event propagation model redeployment process. For this reason, the causality matrix T32 is not updated.

According to this embodiment, in a case where a configuration change event related to a management-target apparatus has been detected, the event propagation model that needs to be redeployed is identified for each configuration change event, and deployment is carried out only for the redeployment-required event propagation model. Therefore, this embodiment makes it possible to curb wasteful redeployment processing and reduce the processing load on the management server 30.

Example 2

A second example will be explained by referring to FIGS. 21 and 23. This example corresponds to a variation of the first example. Therefore, the explanation will focus on the differences with the first example. In this example, a deployment-target event management table creation processing method, which is carried out by the event propagation model deployment module P35, will be explained.

Figure 21:
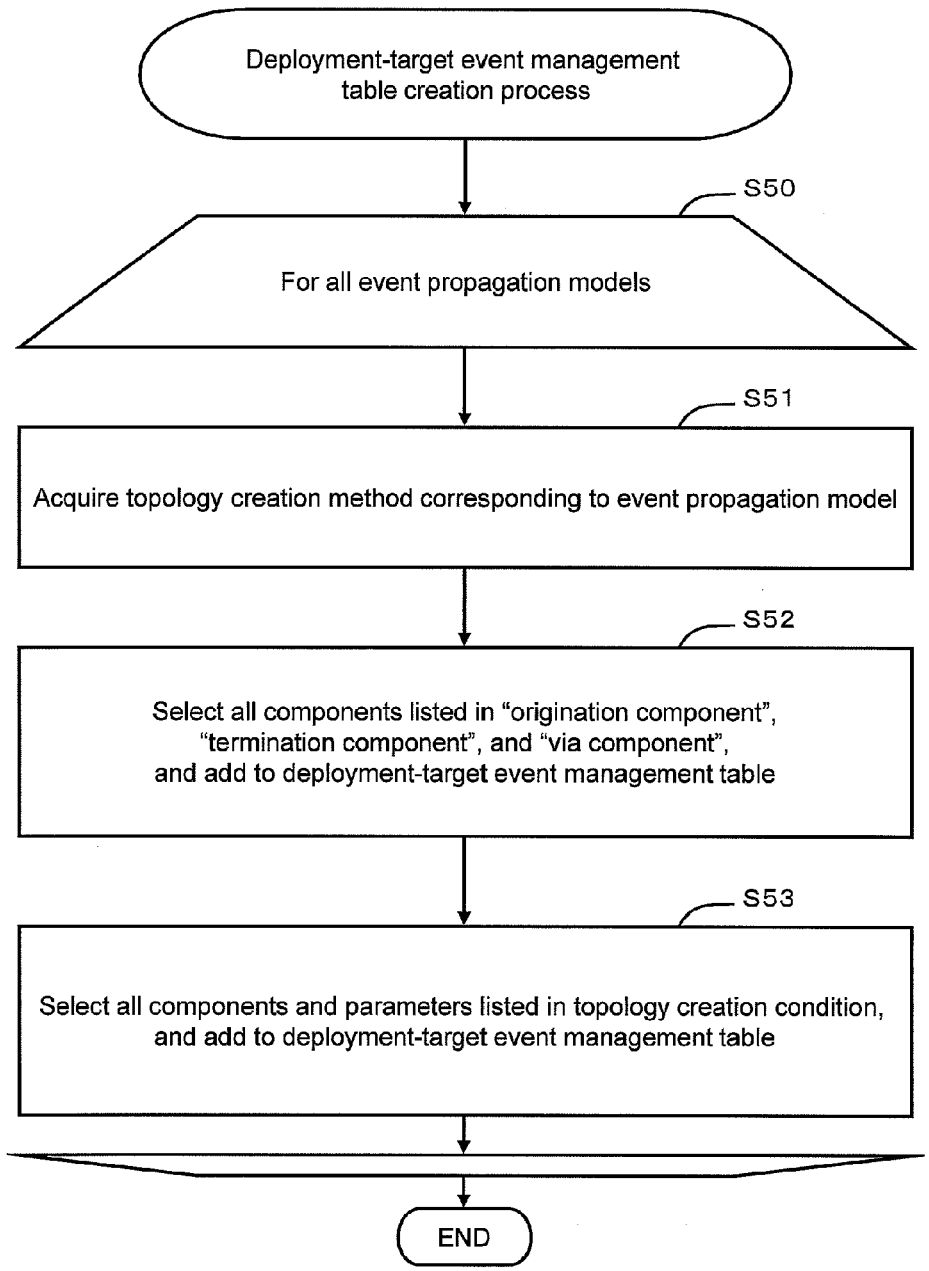
FIG. 21 is a flowchart of a deployment-target event management table creation process.

As shown in the flowchart of FIG. 21, in this example, the event propagation model deployment module P35 automatically creates a deployment-target event management table T34. The event propagation model deployment module P35 will be called the deployment module P35 below for convenience sake.

The process for creating the deployment-target event management table T34 can be executed at a prescribed timing. As the prescribed timing, for example, a case in which the management server 30 is initially booted up, a case in which a new event propagation model is added to the event propagation model repository T31, and a case in which a portion of an event propagation model in the event propagation model repository T31 has been deleted can be cited.

The deployment module P35 repeats the following series of processes S51 through S53 with respect to all the event propagation models defined in the event propagation model repository T31 (S50).

The deployment module P35 refers to the topology creation method repository T33, and acquires a topology creation method for creating the event propagation model repository T31 (S51).

The deployment module P35 selects all the components listed in the origination component, termination component, and via component of the topology creation method (S52). In addition, the deployment module P35 adds each selected component and event propagation model ID to the deployment-target event propagation model management table T34 (S52). In accordance with this, the deployment module P35 sets the event type to "addition, deletion", and, in addition, does not specify a parameter.

Next, the deployment module P35 selects all the components and parameters listed in the topology creation condition (S53). In addition, the deployment module P35 adds each of these components and parameters to the deployment-target event propagation model management table T34 together with the event propagation model ID (S53). In accordance with this, the deployment module P35 sets the event type to "change".

A specific example of the deployment-target event management table creation process is described below.

The deployment module P35 acquires from the topology creation method repository T33 a topology creation method to be used in the creation of an event propagation model with respect to the event propagation model defined in the event propagation model repository T31.

The deployment module P35 selects all the components listed in the origination component, termination component, and via component of the topology creation method, and adds these components to the deployment-target event propagation model management table T35.

For example, as shown in FIG. 12A, the event propagation model (Rule1) comprises a host computer 10 logical volume and a storage apparatus 20 I/O port. Therefore, the topology creation method (TP1) shown in FIG. 14A is used for acquiring the topology with respect to this event propagation model (Rule1).

In the topology creation method (TP1), the origination component is the logical volume of the host computer 10, the termination component is the I/O port of the storage apparatus 20, and the via component is the iSCSI target of the storage apparatus 20. Therefore, the respective components are added to the deployment-target event management table T34 as shown in FIG. 17. In so doing, "addition, deletion" is set in the value of the event type C343. "Rule1" is set in the value of the applicable rule ID (event propagation model ID) 5344.

The deployment module P35 selects all the components and parameters listed in the topology creation condition C334 of the topology creation method, and adds these components and parameters to the deployment-target event propagation model management table T34.

The components and parameters listed in the topology creation condition C334 of the topology creation method (TP1) are the iSCSI initiator name of the logical volume, the iSCSI initiator, which is allowed to coupled with the iSCSI target, the iSCSI target ID of the I/O port 200, and the ID of the iSCSI target. Therefore, the deployment module P35 adds these components and parameters to the deployment-target event management table T34. In so doing, the event type C343 is set to "change", and the applicable rule ID (event propagation model ID C344) is set to Rule1. In accordance with the above processing, the deployment-target event management table T34 is created and transitions to the state shown in FIG. 17. This example achieves the same effects as the first embodiment. In addition, in this example, the deployment-target event management table T34 can be created on the basis of the event propagation model registered in the event propagation model repository T31.

In the example, for example, the deployment-target event management table T34 can be automatically updated in a case where the administrator either adds or deletes an event propagation model. Therefore, the processing load placed on the management server 30 can be reduced while properly creating a causality matrix. In addition, the deployment-target event management table T34 is created automatically, thereby saving the administrator the trouble of having to do so.

FIG. 23 is an overall conceptual diagram schematically showing the relationship between processes and management information in this embodiment. In the deployment-target event management table creation process (FIG. 21), the management server 30 refers to the event propagation model T31 and the topology creation method T33, and creates a deployment-target event management table T34. The deployment-target event management table T34, as was explained using FIG. 17, manages the corresponding relationship between an event, which is the result of the configuration change, and an event propagation model to be redeployed in a case where the event has occurred.

Alternatively, in the need-to-redeploy confirmation process (FIG. 19), the management server 30 refers to the event management table T30 and checks for an unprocessed event. In a case where an unprocessed event exists, the management server 30 refers to the deployment-target event management table T34, and identifies the event propagation model that needs to be redeployed with respect this unprocessed event. The management server 30 executes the event propagation model redeployment process only for the identified event propagation model.

Furthermore, the first and second examples can also be expressed as computer programs as follows:

"A computer program for causing a computer to function as a management apparatus for managing a computer system comprising multiple node apparatuses,
wherein at least one prescribed analysis rule and target event management information for managing the corresponding relationship between an event, which is capable of being detected by the above-mentioned management apparatus, and the above-mentioned prescribed analysis rule are stored in a storage device of the above-mentioned computer, and
the above-mentioned prescribed analysis rule defines the relationship between a causal event, which is the cause of a problem, and a relevant event, which denotes the problem that occurs as a result of the above-mentioned causal event,
the computer program realizing in the above-mentioned computer:

a function for monitoring the above-mentioned each node apparatus;

a function for determining, in a case where a configuration change in the above-mentioned each node apparatus is detected as an event, whether or not this event is registered in the above-mentioned target event management information; and a function for executing a prescribed process in a case where the detected above-mentioned event is registered in the above-mentioned target event management information."

REFERENCE SIGNS LIST

10 Host computer
20 Storage apparatus
30 Management server
60 Communication network

The invention claimed is:

1. A method for managing a computer system,
wherein the computer system comprises multiple node apparatuses and a management apparatus for managing the multiple node apparatuses;
the management apparatus holds at least one prescribed analysis rule and target event management information for managing a corresponding relationship between an event that can be detected by the management apparatus, and the prescribed analysis rule; and
the prescribed analysis rule defines a relationship between a causal event constituting a cause of an occurrence of a problem, and a relevant event denoting a problem that arises as a result of the causal event,
the computer system management method comprising the steps of:
the management apparatus determining, in a case where a configuration change in each of the node apparatuses is detected as an event, whether or not this event is registered in the target event management information; and
the management apparatus executing a prescribed process in a case where the detected event is registered in the target event management information;
wherein the management apparatus:
holds topology creation information for storing multiple topology creation methods for creating a topology denoting a coupling relationship among the respective node apparatuses;
acquires, from the topology creation information, a prescribed topology creation method corresponding to the prescribed analysis rule; and
prepares and holds the target event management information by registering the node apparatus stipulated in the acquired prescribed topology creation method, in the target event management information as a source of an event.

2. A computer system management method according to claim 1, wherein the management apparatus acquires configuration information from the multiple node apparatuses, and
the prescribed process is a process for identifying the analysis rule to be processed based on the detected event and the target event management information, applying the identified analysis rule to the configuration information, and creating information for problem analysis.

3. A computer system management method according to claim 1, wherein the management apparatus prepares and holds the target event management information at a prescribed timing, and the prescribed timing is at least any one of a case in which the management apparatus is initially booted up, a case in which a new prescribed analysis rule is added, or a case in which the existing prescribed analysis rule is either deleted or changed.

4. A computer system management method according to claim 3, wherein, in a case where a problem is detected in any of the respective node apparatuses, a cause of the problem that has been detected is inferred based on the information for the problem analysis.

5. A management apparatus for managing a computer system comprising multiple node apparatuses, the computer system management apparatus comprising:
a microprocessor;
a storage apparatus for storing a prescribed computer program, which is executed by the microprocessor, and prescribed information; and
a communication port for the microprocessor to communicate with the respective node apparatuses,
wherein the storage apparatus stores at least one prescribed analysis rule, and target event management information for managing a corresponding relationship between an event that can be detected by the management apparatus, and the prescribed analysis rule,
the prescribed analysis rule defines a relationship between a causal event constituting a cause of an occurrence of a problem, and a relevant event denoting a problem that arises as a result of the causal event, and
the microprocessor, by executing the prescribed computer program:
monitors the respective node apparatuses;
determines, in a case where a configuration change in each of the node apparatuses has been detected as an event, whether or not this event is registered in the target event management information; and
executes a prescribed process in a case where the detected event is registered in the target event management information;
wherein the storage apparatus also stores topology creation information for storing multiple topology creation methods for creating a topology denoting a coupling relationship among the respective node apparatuses, and
the microprocessor:
acquires, from the topology creation information, a prescribed topology creation method corresponding to the prescribed analysis rule; and
prepares and holds the target event management information by registering the node apparatus stipulated in the acquired prescribed topology creation method, in the target event management information as a source of an event.

6. A computer system management apparatus according to claim 5, wherein the storage apparatus stores configuration information acquired from the multiple node apparatuses, and
the prescribed process is a process for identifying the analysis rule to be processed based on the detected event and the target event management information, applying the identified analysis rule to the configuration information, and creating information for problem analysis.

7. A computer system management apparatus according to claim 5, wherein the microprocessor prepares and holds the target event management information at a prescribed timing, and
the prescribed timing is at least any one of a case in which the management apparatus is initially booted up, a case in which a new prescribed analysis rule is added, or a case in which the existing prescribed analysis rule is either deleted or changed.

* * * * *